(12) United States Patent
Ishikawa et al.

(10) Patent No.: US 8,992,109 B2
(45) Date of Patent: Mar. 31, 2015

(54) BUTT-WELDED JOINT OF WELDED STRUCTURE, AND METHOD FOR MANUFACTURING THE SAME

(75) Inventors: Tadashi Ishikawa, Tokyo (JP); Ryuichi Honma, Tokyo (JP); Kazutoshi Ichikawa, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/511,071

(22) PCT Filed: Dec. 2, 2010

(86) PCT No.: PCT/JP2010/071564
§ 371 (c)(1),
(2), (4) Date: May 21, 2012

(87) PCT Pub. No.: WO2011/068155
PCT Pub. Date: Jun. 9, 2011

(65) Prior Publication Data
US 2012/0288324 A1    Nov. 15, 2012

(30) Foreign Application Priority Data

Dec. 4, 2009  (JP) ................................. 2009-277021
Dec. 4, 2009  (JP) ................................. 2009-277050

(51) Int. Cl.
*B23K 26/21* (2014.01)
*F03D 11/04* (2006.01)
(Continued)

(52) U.S. Cl.
CPC .............. *F03D 11/04* (2013.01); *B23K 15/006* (2013.01); *B23K 15/06* (2013.01); *B23K 26/26* (2013.01); *C21D 9/50* (2013.01); *C21D 1/09* (2013.01);
(Continued)

(58) Field of Classification Search
USPC .............................. 403/270–272; 219/121.14
See application file for complete search history.

(56) References Cited

U.S. PATENT DOCUMENTS 4,049,186 A * 9/1977 Hanneman et al. ........... 228/225
4,234,119 A * 11/1980 Masaoka et al. .............. 228/125
(Continued)

FOREIGN PATENT DOCUMENTS

JP    53-141140    12/1978
JP    S3-141140    12/1978
(Continued)

OTHER PUBLICATIONS

International Search Report dated Mar. 15, 2011, issued in corresponding PCT Application No. PCT/JP2010/071564.
(Continued)

*Primary Examiner* — Joshua Kennedy
(74) *Attorney, Agent, or Firm* — Kenyon & Kenyon LLP

(57) ABSTRACT

A butt-welded joint of a welded structure which includes a pair of target metals; a weld bead formed by irradiating a high-energy density beam to a butt portion between the pair of the target metals and has a width W on the irradiated side surface; and a pair of altered zones consisting of heat-affected zones formed by irradiating another high-energy density beam to both sides of the center of the weld bead in the weld bead width direction such that the pair of the altered zones are located on respective sides of the center of the weld bead and each has a band shape extending in the weld bead length direction and a method for manufacturing the butt-welded joint of the welded structure.

6 Claims, 5 Drawing Sheets

(51) Int. Cl.
  *B23K 15/00* (2006.01)
  *B23K 15/06* (2006.01)
  *B23K 26/26* (2014.01)
  *C21D 9/50* (2006.01)
  *C21D 1/09* (2006.01)

(52) U.S. Cl.
  CPC ......... *B23K 2201/06* (2013.01); *B23K 2201/18* (2013.01); *B23K 2203/04* (2013.01); *F05B 2230/233* (2013.01); *Y02E 10/728* (2013.01)
  USPC ........................................................ 403/270

(56) References Cited

U.S. PATENT DOCUMENTS

| | | | |
|---|---|---|---|
| 4,247,037 A * | 1/1981 | Tamai et al. | 228/203 |
| 4,348,041 A * | 9/1982 | Imai et al. | 285/288.2 |
| 4,624,402 A * | 11/1986 | Pitcairn et al. | 228/119 |
| 4,683,014 A * | 7/1987 | Porowski et al. | 72/30.1 |
| 6,336,583 B1 * | 1/2002 | Wang et al. | 228/175 |
| 6,919,534 B2 * | 7/2005 | Komai et al. | 219/137 R |
| 8,322,592 B2 * | 12/2012 | Kiuchi et al. | 228/119 |
| 2004/0000539 A1 * | 1/2004 | Takikawa et al. | 219/121.64 |
| 2005/0121426 A1 * | 6/2005 | Wang et al. | 219/121.64 |
| 2006/0137777 A1 * | 6/2006 | Ishikawa et al. | 148/558 |
| 2012/0237287 A1 * | 9/2012 | Honma et al. | 403/271 |
| 2012/0241420 A1 * | 9/2012 | Ishikawa et al. | 219/121.13 |

FOREIGN PATENT DOCUMENTS

| | | |
|---|---|---|
| JP | 54-092541 | 7/1979 |
| JP | 60-165323 | 8/1985 |
| JP | 61-052315 | 3/1986 |
| JP | 01-205892 | 8/1989 |
| JP | 04-361876 | 12/1992 |
| JP | 11-350042 | 12/1999 |
| JP | 2004-130314 | 4/2004 |
| JP | 2004-181530 | 7/2004 |
| JP | 2005-046858 | 2/2005 |
| JP | 2006-037397 | 2/2006 |
| JP | 2006-336098 | 12/2006 |
| JP | 2007-092406 | 4/2007 |
| JP | 2007-322400 | 12/2007 |
| JP | 2008-111406 | 5/2008 |
| JP | 2008-114276 | 5/2008 |
| JP | 2008-183619 | 8/2008 |
| WO | 99/16101 | 4/1999 |
| WO | 2008/107660 | 9/2008 |

OTHER PUBLICATIONS

Korean Notice of Allowance dated Jul. 2, 2012 issued in corresponding Korean Application No. 10-2012-7013951 [with English translation].

European Search Report dated Jun. 19, 2013 issued in corresponding EP Application No. 10 83 4605.

* cited by examiner

US 8,992,109 B2

BUTT-WELDED JOINT OF WELDED STRUCTURE, AND METHOD FOR MANUFACTURING THE SAME

CROSS-REFERENCE TO RELATED APPLICATIONS

The present application is a national stage application of International Application No. PCT/JP2010/071564, filed Dec. 2, 2010, which claims priority to Japanese Patent Application No. 2009-277021 filed in Japan on Dec. 4, 2009 and Japanese Patent Application No. 2009-277050 filed in Japan on Dec. 4, 2009, the disclosures of which are incorporated herein by reference in their entirety.

FIELD OF THE INVENTION

The present invention relates to a butt-welded joint of a welded structure employing a high-energy density beam, and a method for manufacturing the butt-welded joint of the welded structure. In particular, the present invention relates to a weld joint having excellent fatigue characteristics under a vibration environment in a giga-cycle range and a method for manufacturing the weld joint.

BACKGROUND OF THE INVENTION

In recent years, a problem has arisen of reducing $CO_2$ gas, which is said to be a cause of global warming, or the exhaustion of oil or other fossil fuels in the future. To address these problems, recyclable natural energy has been actively used. Wind power is one form of recyclable natural energy, and large-scale wind power has been increasingly used on a worldwide level.

The most suitable area for wind power generation is an area where strong wind is expected to blow constantly, and offshore wind power generators are under planning or actually in operation all over the world (see Patent Documents 1 to 4). In order to build a tower for wind power generation at sea, it is necessary to drive the foundation portion of the tower into the sea bed. Further, in order to obtain sufficient height of the turbine blade of the wind power generator from the sea level, the foundation portion of the tower is required to have sufficient length, rigidity, and strength.

Thus, the foundation portion of the tower of the wind power generator employs a pipe structure having a wall thickness exceeding 50 mm, for example, of approximately 100 mm, and a large diameter in cross-section of approximately 4 m. Further, the total height of the tower is as high as 80 m or more. Such a large structure is required to be welded and built on the coast near the construction site in an easy and efficient manner.

Under the circumstances described above, there arises a new demand for welding an ultra-thick steel plate having a thickness of 100 mm on-site in a highly efficient manner.

In general, efficiency in welding can be increased by employing a high-energy density beam such as an electron beam and laser beam. However, welding through the electron beam is required to be performed in a vacuum chamber under a high vacuum state, for example, of 0.1 Pa or less. Thus, the thickness of the steel plate to be welded has been limited.

In recent years, to address the circumstances described above, the Welding Institute of the United Kingdom has proposed and developed a welding method (reduced pressure electron beam welding: RPEBW) enabling working under a low vacuum state, for example, of 10 Pa or less, as a welding method enabling efficient welding of an ultra-thick steel plate with a thickness of approximately 100 mm on-site (Patent Document 5).

The tower of a wind power generator at sea is constantly exposed to vibration due to strong wind as described above, and the structure body of the foundation portion and the steel pipe pillar constantly receives repeated loads. Thus, the welded portions are required to have fatigue resistance against vibration under the giga-cycle range, the order of which is higher than ordinary fatigue cycles. In particular, stress increasingly concentrates on the weld toe of the weld bead, causing a reduction in the fatigue strength against repeated loads.

As a measure for alleviating the stress concentration on the weld toe of the weld bead as described above, there has been proposed a technique of alleviating the stress concentration by increasing the radius of curvature of the weld bead 32, and a contact angle θ between a steel plate 31 and a weld bead 32 as illustrated in FIG. 5.

For example, Patent Document 6 proposes adjusting components of flux or components of shield gas to increase the radius of curvature and the contact angle θ. However, the method proposed by Patent Document 6 employs a gas shield arc welding, and is not applicable to welding through a high-energy density beam without using a shield gas.

Further, Patent Document 7 proposes setting the ratio of the thickness of the steel plate relative to the height of the weld bead to 0.2 or less to reduce stress concentration on the weld toe of the weld bead. However, this document only specifies the shape of the weld bead, and does not disclose the specific method for forming the above-described width of the weld bead or specific welding conditions for the forming of the weld bead. Thus, Patent Document 7 lacks reproducibility, and is difficult to be used industrially.

RELATED ART DOCUMENTS

Patent Documents

Patent Document 1: Japanese Unexamined Patent Application, First Publication No. 2008-111406
Patent Document 2: Japanese Unexamined Patent Application, First Publication No. 2007-092406
Patent Document 3: Japanese Unexamined Patent Application, First Publication No. 2007-322400
Patent Document 4: Japanese Unexamined Patent Application, First Publication No. 2006-037397
Patent Document 5: WO 99/16101
Patent Document 6: Japanese Unexamined Patent Application, First Publication No. H04-361876
Patent Document 7: Japanese Unexamined Patent Application, First Publication No. 2004-181530

BRIEF SUMMARY OF THE INVENTION

An object of the present invention is to provide a weld joint having fatigue resistance against vibration in the giga-cycle range and sufficient fracture toughness with significant ease and with reproducibility, by welding a target metal through a first high-energy density beam such as an electron beam and irradiating a second high-energy density beam to alleviate tensile residual stresses of a weld toe, or alleviate stress concentration on a weld bead.

A summary of the present invention is as follows:
(1) An aspect of the present invention provides a butt-welded joint of a welded structure including: a pair of target metals; a weld bead formed by irradiating a first high-energy density beam to a butt portion between the pair of the target metals, the weld bead having a width W on an irradiated side surface; and a pair of altered zones formed, on a surface of the butt-welded joint having the first high-energy density beam irradiated thereto, by irradiating a second high-energy density beam to the surface, the pair of the altered zones having a band shape extending in parallel to the weld bead, and the pair of the altered zones consisting of a pair of heat-affected portions and molten and solidified metals located on a right side and a left side relative to the center of the weld bead in the width direction. Each of the pair of the altered zones has a width of not less than 0.1 W and not more than 10 W, and a thickness of not less than 0.1 mm and not more than 10 mm; a distance between each inner edge of the pair of the altered zones and the center of the weld bead in the width direction is not less than 0 and not more than 4 W; and a distance between each outer edge of the pair of the altered zones and the center of the weld bead in the width direction is not less than 0.6 W and not more than 14 W.

(2) In the butt-welded joint of a welded structure according to (1) above, a distance between each of the inner edges of the pair of the altered zones and the center of the weld bead in the width direction may be not less than 0 and not more than 0.4 W, and the pair of the altered zones may have the thickness of not less than 0.1 mm and not more than 0.5 mm.

(3) In the butt-welded joint of a welded structure according to (2) above, the pair of the altered zones may consist of the heat-affected portion.

(4) In the butt-welded joint of a welded structure according to (1) above, a distance between each of the inner edges of the pair of the altered zones and the center of the weld bead in the width direction may be not less than 1 W and not more than 4 W, and the pair of the altered zones may have the width of not less than 0.1 W and not more than 2 W and a thickness of not less than 5 mm and not more than 10 mm.

(5) In the butt-welded joint of a welded structure according to any one of (1) to (4) above, a tensile residual stress $\sigma_R$ in a direction perpendicular to the weld bead on a surface of the target metal may be not more than YSb/2 at a position located 1 mm outward from a weld toe of the weld bead on a surface of the target metal having the first high-energy density beam irradiated thereto, where a yield strength of the target material is YSb.

(6) In the butt-welded joint of a welded structure according to any one of (1) to (4) above, the pair of the target metals may be formed by a high-strength steel plate having a plate thickness exceeding 30 mm.

(7) In the butt-welded joint of a welded structure according to any one of (1) to (4) above, the welded structure may be a structure body or a steel pipe pillar constituting a foundation portion of a tower of a wind power generator.

(8) A second aspect of the present invention provides a method for manufacturing a butt-welded joint of a welded structure, the method including: irradiating a first high-energy density beam to a butt portion between a pair of target metals to form a weld bead having a width of W on an irradiated side surface as a first irradiation step; and irradiating a second high-energy density beam, from a side of the butt-welded joint from which the first high-energy density beam is irradiated, to heat an irradiated portion to not less than Ac1 to form a pair of altered zones having a band shape extending in parallel to the weld bead as a second irradiation step, the pair of the altered zones consisting of a pair of heat-affected portions and molten and solidified metals located on a right side and a left side relative to the center of the weld bead in the width direction. An amount of heat inputted in the second irradiation step is not less than 2% and not more than 30% of the amount of heat inputted in the first irradiation step; each of the pair of the altered zones has a width of not less than 0.1 W and not more than 10 W, and a thickness of not less than 0.1 mm and not more than 10 mm; a distance between each inner edge of the pair of the altered zones and the center of the weld bead in the width direction is not less than 0 and not more than 4 W; and a distance between each outer edge of the pair of the altered zones and the center of the weld bead in the width direction is not less than 0.6 W and not more than 14 W.

(9) In the method for manufacturing a butt-welded joint of a welded structure according to (8) above, in the second irradiation step, a distance between each of the inner edges of the pair of the altered zones and the center of the weld bead in the width direction may be not less than 0 and not more than 0.4 W, and the pair of the altered zones may have the thickness of not less than 0.1 mm and not more than 0.5 mm.

(10) In the method for manufacturing a butt-welded joint of a welded structure according to (9) above, in the second irradiation step, an irradiated portion may be heated to a temperature of not less than Ac1 and less than a melting temperature to obtain the pair of the altered zones consisting of the heat-affected portion.

(11) In the method for manufacturing a butt-welded joint of a welded structure according to (8) above, in the second irradiation step, a distance between each of the inner edges of the pair of the altered zones and the center of the weld bead in the width direction may be not less than 1 W and not more than 4 W, and the pair of the altered zones may have the width of not less than 0.1 W and not more than 2 W and a thickness of not less than 5 mm and not more than 10 mm.

(12) In the method for manufacturing a butt-welded joint of a welded structure according to any one of (8) to (11), the target metals may be formed by a high-strength steel plate having a plate thickness exceeding 30 mm.

(13) In the method for manufacturing a butt-welded joint of a welded structure according to any one of (8) to (11), the welded structure may be a structure body or a steel pipe pillar constituting a foundation portion of a tower of a wind power generator.

According to the weld joint of the present invention, the tensile residual stress of the weld toe is alleviated, or the stress concentration on the weld toe of the weld bead is alleviated, so that it is possible to obtain fatigue characteristics that can withstand the vibration in the giga-cycle range, and has sufficient fracture toughness.

DETAILED DESCRIPTION OF THE INVENTION

Hereinbelow, preferred embodiments of the present invention will be described with reference to the drawings.

First Embodiment

Figure 1:
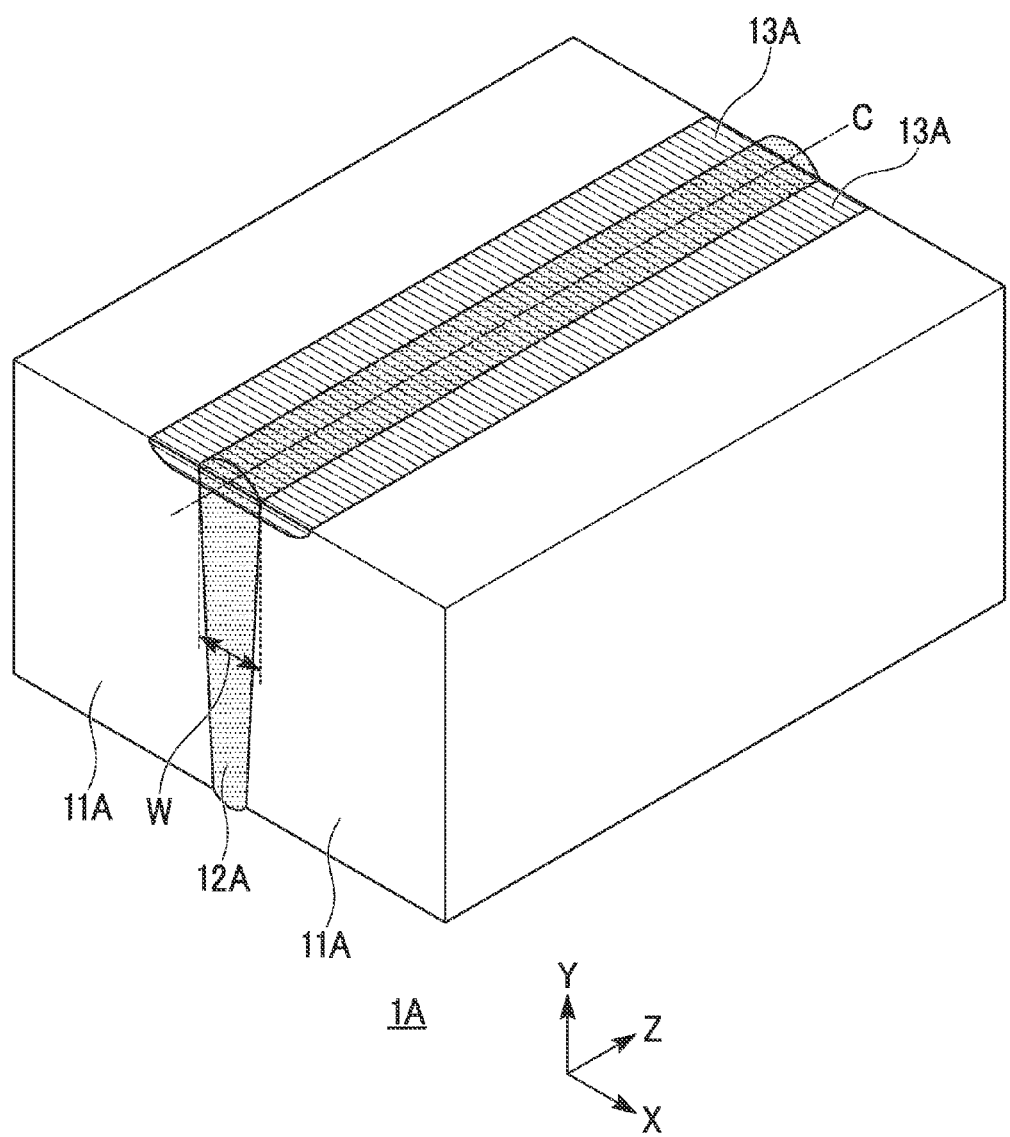
FIG. 1 is a perspective view illustrating a weld joint 1A according to a first embodiment of the present invention.

FIG. 1 illustrates a butt-welded joint 1A of a welded structure according to a first embodiment of the present invention.

The weld joint 1A includes a pair of target metals 11A, 11A, a weld bead 12A having a width W in terms of a surface thereof, and a pair of altered zones 13A, 13A having a band shape extending in parallel to the longitudinal direction of the weld bead 12A and disposed on the right side and the left side with respect to the center (center line C) of the weld bead 12A in the width direction.

Each of the altered zone 13A consists of a molten and solidified metal and a heat-affected zone formed by irradiating the second high-energy density beam.

It should be noted that, in this specification, the molten and solidified metal means a portion of at least one of: the target metal; the welded metal formed with the first high-energy density beam; and the heat-affected zone. This portion is heated to a melt temperature or more with the second high-energy density beam to be molten, and then is solidified. The molten and solidified metal may be referred to as a molten and solidified portion. The width W of the weld bead formed with the first high-energy density beam means a width of a welded metal portion on a beam-irradiated surface side. In the case where the altered zone is formed on the surface with the second high-energy density beam, the width W is a width of a welded metal formed with the first high-energy density beam and measured at a position as measurably close as possible to the beam-irradiated surface of the welded metal formed with the first high-energy density beam (at a portion in contact with the altered zone in the case where the measurable position is the deepest position). In this specification, the heat-affected zone of the altered zone means a portion heated to a temperature not less than Ac1 temperature and less than the melting temperature with the second high-energy density beam.

Further, in this specification, as illustrated in FIG. 1, an X direction represents the width direction of the weld bead, a Y direction represents a thickness direction of the weld bead, in other words, a depth direction of the weld bead, and a Z direction represents the longitudinal direction of the weld bead.

The weld bead 12A is formed by irradiating the first high-energy density beam to a butt portion between the pair of the target metals 11A, 11A. Further, on a surface of the weld joint 1A having the first high-energy density beam irradiated thereto, the pair of the altered zones 13A, 13A are formed by irradiating the second high-energy density beam to this surface. As the first high-energy density beam and the second high-energy density beam, it may be possible to use, for example, an electron beam or laser beam.

When the pair of the target metals 11A, 11A are butt-welded with the first high-energy density beam, a Ni-based metal foil or Fe—Ni—Cr-based metal foil may be placed between the target metals. With the metal foil, it is possible to improve the fracture toughness or other characteristics of the weld bead 12A.

The present invention does not specifically limit the pair of target metal 11A, 11A. It may be possible to use a steel material having a plate thickness of 30 mm or more, and a yield strength of 355 MPa or more. For example, it may be possible to use a steel material mainly containing, in % by mass, C: 0.02 to 0.20%, Si: 0.01 to 1.0%, Mn: 0.3 to 2.4%, Al: 0.001 to 0.20%, N: 0.02% or less, P: 0.01% or less, and S: 0.01% or less. Further, depending on the required properties such as strength of the base material and the joint toughness, the steel material may contain 8% or less, or 3% or less, or 1% or less in total of Ni, Cr, Mo, Cu, W, Co, V, Nb, Ti, Zr, Ta, Hf, REM, Y, Ca, Mg, Te, Se, and B. The yield strength of the steel material may be set to 600 MPa or less, or the tensile strength may be set to 450 MPa or more, or 780 MPa or less. The plate thickness may be set to 50 mm or more, or 150 mm or less.

The width of each of the pair of the altered zones 13A, 13A is set to 0.1 W or more. Depending on the requirements, the width of each of the pair of the altered zones 13A, 13A may be set to 0.3 W or more, or 0.5 W or more, or 1.0 W or more. More specifically, by forming the altered zones 13A, 13A having the width of 0.1 W or more with the irradiation of the second high-energy density beam, it is possible to alleviate the tensile residual stress in the vicinity of the weld toe of the weld bead 12A occurring due to the irradiation of the first high-energy density beam, or modify it into the compressive residual stress. The upper limit of the width of the altered zone 13A is not necessarily set. However, since it is not easy to irradiate the high-energy density beam to a wide range of over 10 W, the upper limit thereof is set to 10 W. Depending on the applications, the upper limit of the width may be set to 7 W, 4 W, or 2 W.

The thickness of each of the pair of the altered zones 13A, 13A is set to 0.1 mm or more. More specifically, by forming the altered zones 13A, 13A having a thickness of 0.1 mm or more with the second high-energy density beam, it is possible to alleviate the tensile residual stress in the vicinity of the weld toe of the weld bead 12A occurring due to the irradiation of the first high-energy density beam, or modify it to the compressive residual stress. Depending on the requirements, the thickness of the pair of the altered zones 13A, 13A may be set to 0.2 mm, or 0.3 mm or more. In the case where the thickness of each of the altered zones 13A, 13A exceeds 10 mm, the tensile residual stress caused by the irradiation of the second high-energy density beam exceeds the effect of alleviating the tensile residual stress obtained from the irradiation of the second high-energy density beam, and hence, the upper limit thereof is set to 10 mm. Depending on requirements, the upper limit thereof may be set to 9 mm or less, or 8 mm or less.

However, at the weld toe, the thickness of each of the altered zones 13A, 13A may be set to 1.0 mm or less, preferably to 0.8 mm or less, more preferably to 0.5 mm or less.

In order to reduce the residual stress at the weld toe, it is only necessary to set the distance between each of the outer edges of the pair of the altered zones 13A, 13A and the center line C of the weld bead 12A to 0.6 W or more. The upper limit thereof corresponds to the sum of 10 W, which is the upper limit of the width of the altered zone, and 4 W, which is the upper limit of the inner edge distance of the altered zone, and is set to 14 W or less.

According to the weld joint 1A described above, the area having reduced tensile residual stress is formed at both of the weld toes of the weld bead 12A, and hence, excellent fatigue characteristics can be obtained. Thus, a welded structure employing the weld joint 1A can be used as a structure body or steel pipe pillar constituting a foundation portion of the tower of the wind power generator used under the giga-cycle environment.

In this embodiment, both sides of the weld bead 12A are heated to be Ac1 temperature or more to form the altered zone to alleviate the tensile residual stress of the weld toe, thereby improving the resistance to occurrence of fatigue cracks. The resulting heat effect makes the structure of the altered zone different from the base material, and hence, the altered zone can be clearly distinguished from the base material through etching using nital etching solution.

Figure 2:
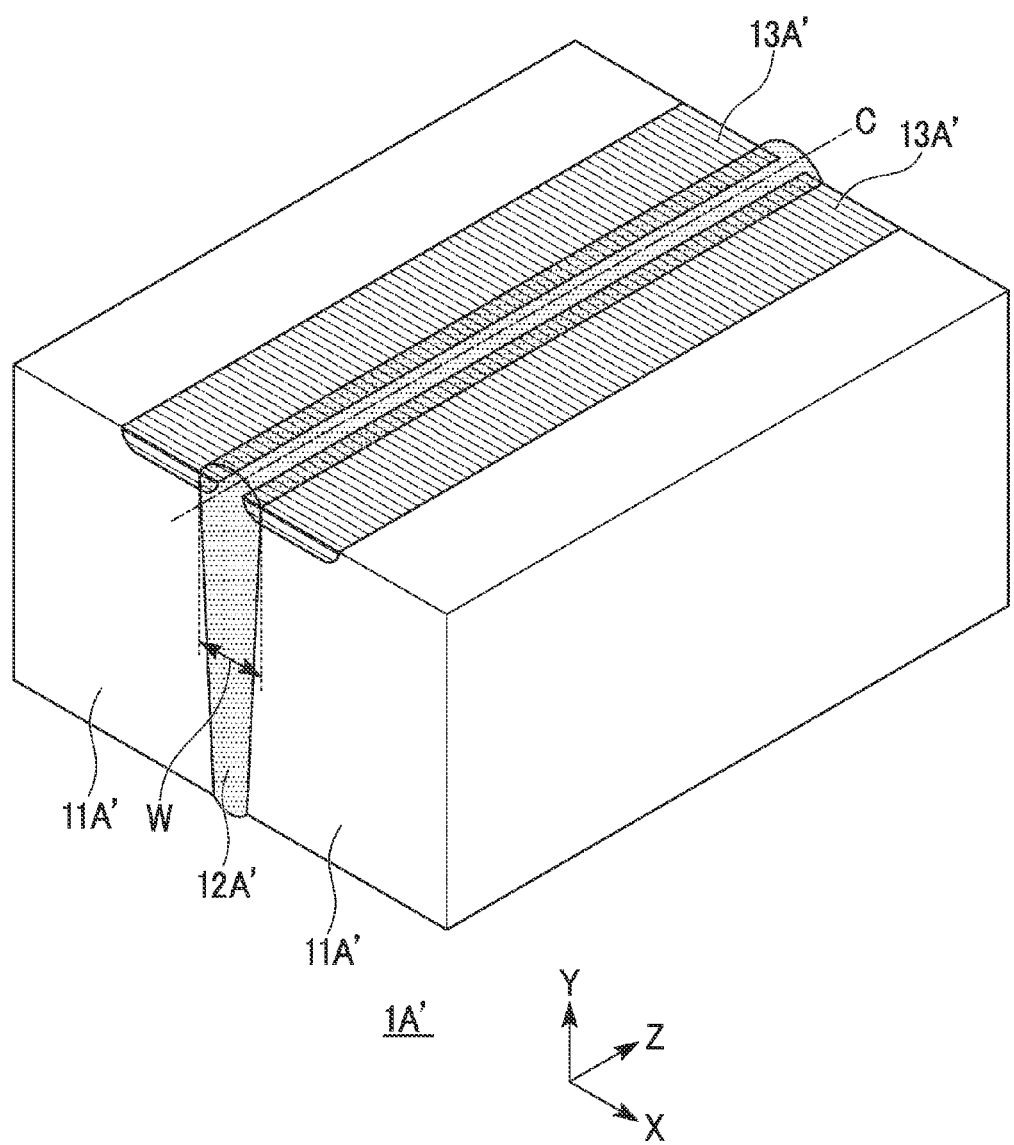
FIG. 2 is a perspective view illustrating a weld joint 1A', which is a modification example of the weld joint 1A.

It should be noted that, in the weld joint 1A illustrated in FIG. 1, the pair of the altered zones 13A, 13A are formed so as to be next to each other. However, as illustrated in FIG. 2 as a modification example, a weld joint 1A' may have a configuration in which each inner edge of a pair of altered zones 13A', 13A' is spaced from the center line C of a weld bead 12A'.

More specifically, the distance between the pair of the altered zones 13A, 13A (hereinafter, referred to as separation distance) is set to 0 or more. However, in the case where the second high-energy density beam is irradiated in a manner such that the distance exceeds 4 W, this irradiation does not have any effect on the tensile residual stress in the vicinity of the weld toe of the weld bead 12A occurring due to the irradiation of the first high-energy density beam, and hence, the upper limit of the distance is set to 4 W. Note that, in the case where the separation distance is zero, the pair of the altered zones 13A, 13A can be regarded as one altered zone covering the surface of the weld bead 12A, as illustrated in FIG. 1.

Next, a method of manufacturing the weld joint 1A according to this embodiment will be described in detail.

The weld joint 1A according to this embodiment is manufactured through a first irradiation step of irradiating the first high-energy density beam to a butt portion between the pair of target metals 11A, 11A, and a second irradiation step of irradiating the second high-energy density beam to the weld joint 1A from the side from which the first high-energy density beam is irradiated. More specifically, through the first irradiation step, the weld bead 12A having a surface with a width W is formed, and through the second irradiation step, a portion having the second high-energy density beam irradiated thereto is heated to Ac1 or more to form the pair of the altered zones 13A, 13A each having a band shape extending in parallel to the weld bead 12A and located on the right side and the left side of the center (center line C) of the weld bead 12A in the width direction. Note that, when the separation distance is zero, it may be possible to irradiate the beam in the second irradiation step in a manner that forms one altered zone covering the surface of the weld bead 12A as illustrated in FIG. 1.

The amount of heat inputted in the second irradiation step may be set to not less than 2% and not more than 30% of the amount of heat inputted in the first irradiation step. Hereinbelow, the ratio of the amount of heat inputted in the second irradiation step relative to the amount of heat inputted in the first irradiation step is referred to as an input heat ratio. By controlling the input heat ratio to be 2% or more, it is possible to reliably alleviate the tensile residual stress in the vicinity of the weld toe of the weld bead 12A. Further, by controlling the input heat ratio to be 30% or less, it is possible to suppress the growth of the average particle diameter of the crystal grain in the target metal 11A, so that the effect of preventing the deterioration in the toughness in the vicinity of the weld bead 12A can be obtained.

In the second irradiation step, the irradiation conditions of the second high-energy density beam are appropriately set such that each of the width, the thickness, and the separation distance of the pair of the altered zones 13A, 13A falls in the appropriate range described above. Further, the second high-energy density beam may be irradiated in a weaving manner depending on applications. More specifically, the second high-energy density beam may be irradiated toward the longitudinal direction (Z direction) of the weld bead 12A while moving in the width direction (X direction). With this configuration, it is possible to form the altered zone 13A having a predetermined width to reduce the residual stress while reducing the amount of inputted heat from the irradiation of the second high-energy density beam.

The first high-energy density beam may be irradiated under the conditions, for example, of a voltage of 150V, electric current of 180 mA, and welding rate of 25 mm/min in the case where the electron beam is employed and the target material 11A has a plate thickness of 80 mm.

The second high-energy density beam may be irradiated under the condition, for example, of a voltage of 150V and electric current of 100 mA in the case where the electron beam is employed and the target material 11A has a plate thickness of 80 mm. By adjusting the irradiation rate in the X direction and the Z direction, it is possible to obtain the altered zone having the target thickness and width.

In the case where RPEBW welding is employed in the first irradiation step, the width of the weld bead 12A tends to increase as compared with the case where the welding through the electron beam is performed in the vacuum chamber under the high vacuum state. Thus, in order to stabilize the value of the fracture toughness of the weld joint 1A in the case where the RPEBW welding is employed, it is desirable to set the width of the weld bead 12A to 20% or less, or 10% or less of the plate thickness of the target metal 11A. Alternatively, it may be possible to limit the bead width to 15 mm or less, or 11 mm or less, or 7 mm or less, or 6 mm or less, or 5 mm or less.

Second Embodiment

Figure 3:
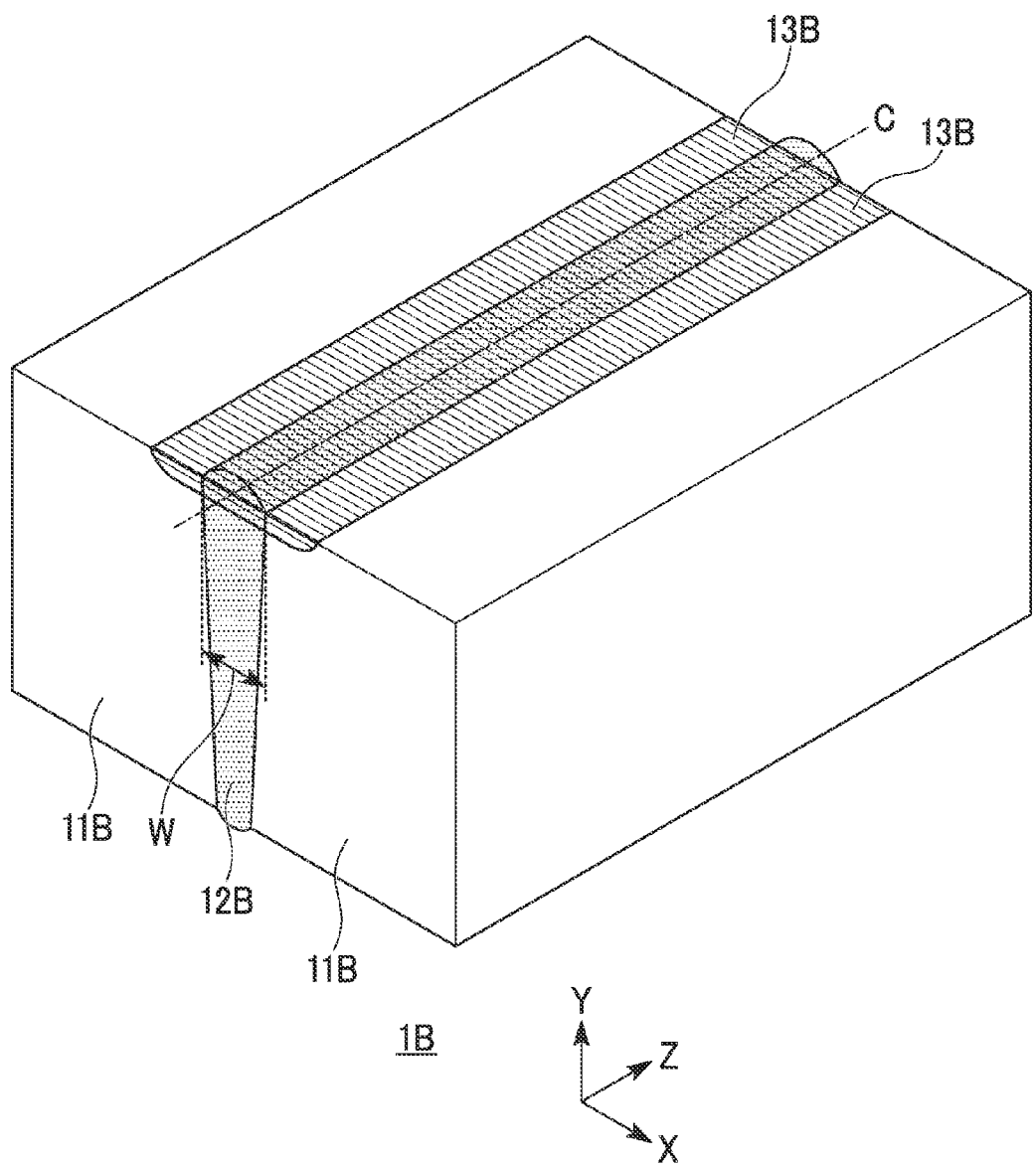
FIG. 3 is a perspective view illustrating a weld joint 1B according to a second embodiment of the present invention.

FIG. 3 illustrates a butt-welded joint 1B of a welded structure according to a second embodiment of the present invention.

The weld joint 1B includes a pair of target metals 11B, 11B, a weld bead 12B having a width W in terms of a surface thereof, and a pair of altered zones 13B, 13B having a band shape extending in parallel to the longitudinal direction of the weld bead 12B and disposed on the right side and the left side with respect to the center (center line C) of the weld bead 12B in the width direction.

The altered zone 13B consists of a molten and solidified metal and a heat-affected zone formed by irradiating the second high-energy density beam. However, it is preferable that the altered zone 13B not include the molten and solidified metal. In other words, it is preferable that the altered zone 13B consist of the heat-affected zone. This is because, in the case where the altered zone 13B includes the molten and solidified metal, the tensile residual stress generated by solidification of the molten metal is large, and the effect of improving the fatigue strength decreases.

The weld bead 12B is formed by irradiating the first high-energy density beam to the butt portion between the pair of the target metals 11B, 11B. On a surface of the weld joint 1B having the first high-energy density beam irradiated thereto, the pair of the altered zones 13B, 13B are formed by irradiating the second high-energy density beam to the surface. As the first high-energy density beam and the second high-energy density beam, it may be possible to use, for example, an electron beam or laser beam.

In this embodiment, the pair of the altered zones 13B, 13B are formed so as to be next to each other, and the allowable distance between the altered zones is 0.8 W or lower. In other words, the distance between each of the inner edges of the pair of the altered zones 13B, 13B and the center line C of the weld bead 12B may be not less than 0 and not more than 0.4 W. Note that, in the case where the separation distance is zero, the pair of the altered zones 13B, 13B can be regarded as one altered zone covering the surface of the weld bead 12B.

In the case where the pair of the target metals 11B, 11B are butt-welded with the first high-energy density beam, a Ni-based metal foil or a Fe—Ni—Cr-based metal foil may be placed between the target metals. With the metal foil, it is possible to improve the fracture toughness or other characteristics of the weld bead 12B.

The present invention does not specifically limit the pair of the target metals 11B, 11B, and it may be possible to use the same steel material as the target steel metal 11A described in the first embodiment.

The width of each of the pair of the altered zones 13B, 13B is set to a width similar to that of the pair of the altered zones 13A, 13A described in the first embodiment.

The thickness of each of the pair of the altered zones 13B, 13B may be set to not less than 0.1 mm and not more than 0.5 mm. In this case, by irradiating the second high-energy density beam to form the altered zones 13B, 13B having a thickness of 0.1 mm or more, it is possible to alleviate the tensile residual stress in the vicinity of the weld toe of the weld bead 12B occurring due to the irradiation of the first high-energy density beam, or modify it into the compressive residual stress. Further, by controlling the thickness of the altered zones 13B, 13B formed by the irradiation of the second high-energy density beam to be 0.5 mm or less, it is possible to largely reduce the tensile residual stress occurring due to the irradiation of the second high-energy density beam.

In order to reduce the residual stress of the weld toe, the distance between each of the outer edges of the pair of the altered zones 13B, 13B and the center line C of the weld bead 12B may be set to 0.6 W or more. The upper limit of the distance corresponds to the sum of 10 W, which is the upper limit of the width of the altered zone, and 4 W, which is the upper limit of the inner edge distance of the altered zone, and is set to 14 W or less.

According to the weld joint 1B described above, the area having reduced tensile residual stress is formed at both of the weld toes of the weld bead 12B, and hence, excellent fatigue characteristics can be obtained. Thus, a welded structure employing the weld joint 1B can be used as a structure body or steel pipe pillar constituting a foundation portion of the tower of the wind power generator used under the giga-cycle environment.

In this embodiment, both sides of the weld bead 12B in the width direction are heated to be not less than Ac1 temperature and less than the melting temperature to form the altered zone in the vicinity of the weld toe. This makes the structure in the vicinity of the weld toe yielded, and alleviates the tensile residual stress, thereby improving the resistance to occurrence of fatigue cracks.

Next, a method of manufacturing the weld joint 1B according to this embodiment will be described in detail.

The weld joint 1B according to this embodiment is manufactured through a first irradiation step of irradiating the first high-energy density beam to a butt portion between the pair of the target metals 11B, 11B, and a second irradiation step of irradiating the second high-energy density beam to the weld joint 1B from the side from which the first high-energy density beam is irradiated. More specifically, through the first irradiation step, the weld bead 12B having the surface with a width W is formed, and through the second irradiation step, a portion having the second high-energy density beam irradiated thereto is heated to not less than Ac1 and less than the melting temperature to form the pair of the altered zones 13B, 13B each having a band shape extending in parallel to the weld bead 12B and located on the right side and the left side of the center (center line C) of the weld bead 12B in the width direction. Note that, when the separation distance is zero, it may be possible to irradiate the beam in the second irradiation step in a manner that forms one altered zone covering the surface of the weld bead 12B.

The amount of heat inputted in the second irradiation step may be set to not less than 2% and not more than 30% of the amount of heat inputted in the first irradiation step as in the method of manufacturing the weld joint 1A according to the first embodiment. However, in order to reliably obtain the altered zone having the thickness of 0.5 mm or less, the amount of heat inputted in the second irradiation step may be set to 15% or less, or 10% or less, or 7% or less, or 5% or less of the amount of heat inputted in the first irradiation step.

In the second irradiation step, the irradiation conditions of the second high-energy density beam are appropriately set such that each of the width, the thickness, and the separation distance of the pair of the altered zones 13B, 13B falls in the appropriate range described above. Further, depending on applications, the second high-energy density beam may be irradiated in a weaving manner. More specifically, the second high-energy density beam may be irradiated toward the longitudinal direction (Z direction) of the weld bead 12B while moving in the width direction (X direction) of the weld bead 12B. With this configuration, it is possible to form the altered zone 13B having a predetermined width to reduce the residual stress while reducing the amount of inputted heat from the irradiation of the second high-energy density beam.

The first high-energy density beam may be irradiated under the conditions, for example, of a voltage of 150V, electric current of 180 mA, and welding rate of 25 mm/min in the case where the electron beam is employed and the target material 11B has a plate thickness of 80 mm.

The second high-energy density beam may be irradiated under the condition, for example, of a voltage of 150V and electric current of 100 mA in the case where the electron beam is employed and the target material 11B has a plate thickness of 80 mm. By adjusting the irradiation rate in the X direction and the Z direction, it is possible to obtain the altered zone having target thickness and width.

In the case where RPEBW welding is employed in the first irradiation step, the width of the weld bead 12B tends to increase as compared with the case where the welding through the electron beam is performed in the vacuum chamber under the high vacuum state. Thus, in order to stabilize the value of the fracture toughness of the weld joint 1B in the case where the RPEBW welding is employed, it is desirable to set the width of the weld bead 12B to 20% or less, or 10% or less of the plate thickness of the target metal 11B. Alternatively, it may be possible to limit the bead width to 15 mm or less, or 11 mm or less, or 7 mm or less, or 6 mm or less, or 5 mm or less.

Third Embodiment

Figure 4:
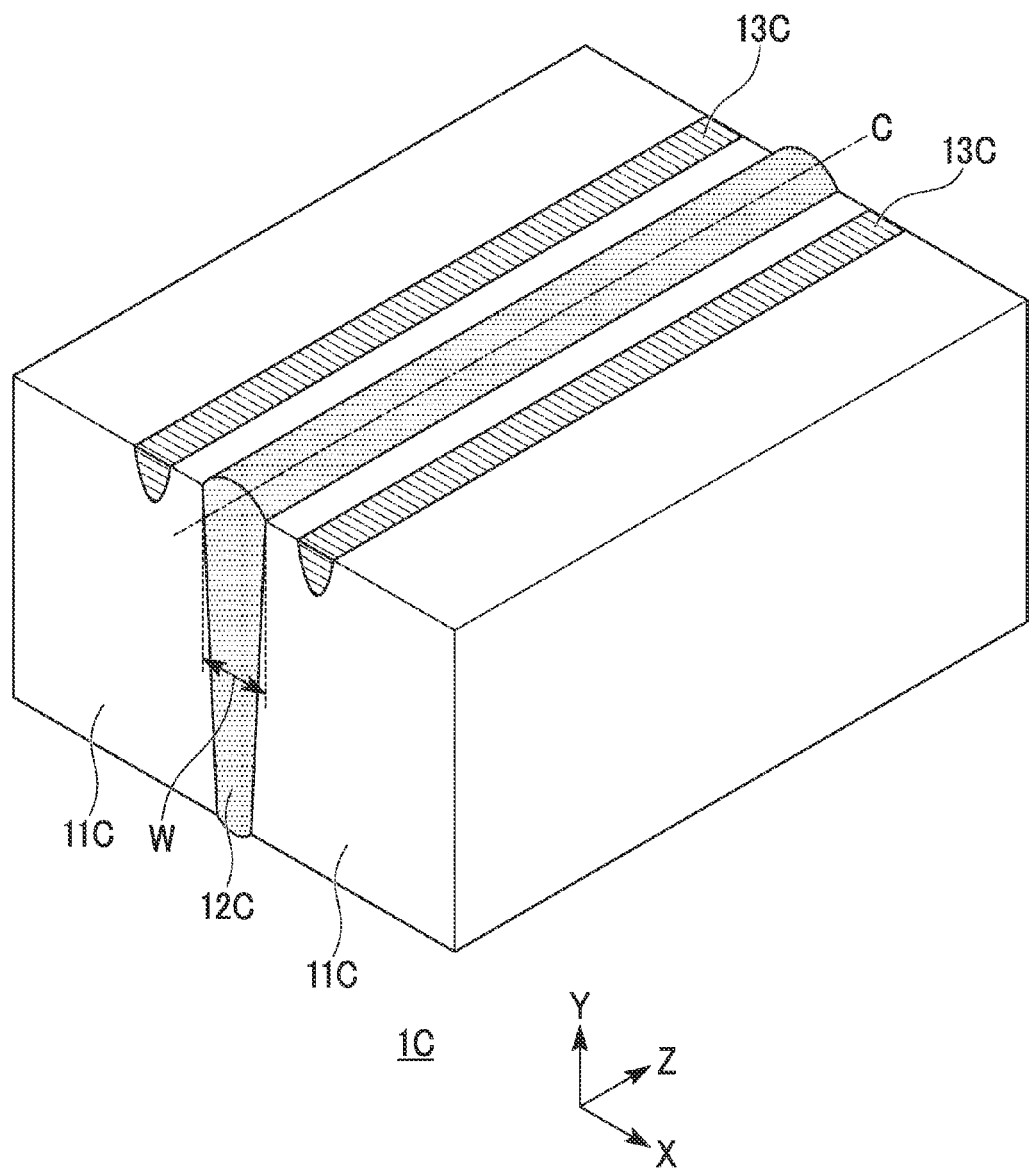
FIG. 4 is a perspective view illustrating a weld joint 1C according to a third embodiment of the present invention.
Figure 5:
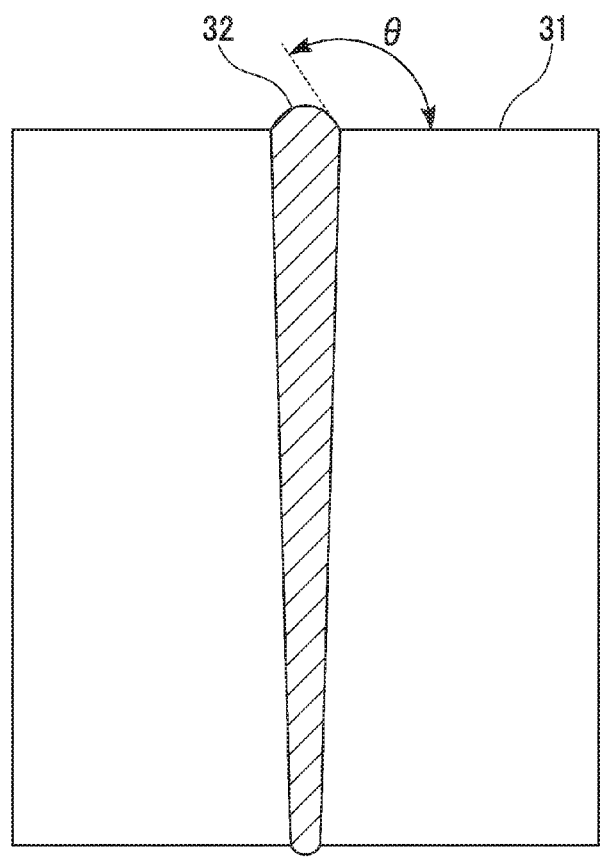
FIG. 5 is a sectional schematic view illustrating a conventional weld joint.

FIG. 4 illustrates a butt-welded joint 1C of a welded structure according to a third embodiment of the present invention.

The weld joint 1C includes a pair of target metals 11C, 11C, a weld bead 12C having a width W in terms of a surface thereof, and a pair of altered zones 13C, 13C having a band shape extending in parallel to the longitudinal direction of the weld bead 12C and disposed on the right side and the left side with respect to the width center (center line C) of the weld bead 12C.

The altered zone 13C consists of a molten and solidified metal and a heat-affected zone formed by irradiating the second high-energy density beam.

The weld bead 12C is formed by irradiating the first high-energy density beam to a butt portion between the pair of the target metals 11C, 11C. On a surface of the weld joint 1C having the first high-energy density beam irradiated thereto, the pair of the altered zones 13C, 13C are formed by irradiating the second high-energy density beam to the surface. As the first high-energy density beam and the second high-energy density beam, it may be possible to use, for example, an electron beam or laser beam.

In this embodiment, the pair of the altered zones 13C, 13C are formed so as to be spaced from each other. More specifically, the distance between each of the inner edges of the pair of the altered zones 13C, 13C and the center line C of the weld bead 12C may be set to not less than 1 W and not more than 4 W.

In the case where the pair of the target metals 11C, 11C are butt-welded with the first high-energy density beam, a Ni-based metal foil or Fe—Ni—Cr-based metal foil may be placed between the target metals. With the metal foil, it is possible to improve the fracture toughness or other characteristics of the weld bead 12C.

The present invention does not specifically limit the pair of the target metals 11C, 11C, and it may be possible to use the same steel material as the target metal 11A described in the first embodiment.

The width of each of the pair of the altered zones 13C, 13C may be set to 0.1 W or more. Depending on applications, the width may be set to 0.2 W or more, or 0.3 W or more. More specifically, by irradiating the second high-energy density beam to form the altered zones 13C, 13C having a width of 0.1 W or more, it is possible to alleviate the tensile residual stress in the vicinity of the weld toe of the weld bead 12C occurring due to the irradiation of the first high-energy density beam, or modify it into the compressive residual stress. However, in the case where the width of each of the pair of the altered zones 13C, 13C exceeds 2.0 W, it has only limited effectiveness, and further, the adverse effect of the residual stress occurring due to the irradiation of the second high-energy density beam increases to a non-negligible level. Depending on the applications, the upper limit of the width may be set to 1.8 W, 1.5 W, or 1.2 W. Alternatively, the upper limit of the width may be set to 0.3 W or 0.5 W.

The thickness of each of the pair of the altered zones 13C, 13C may be set to 5 mm or more. More specifically, by irradiating the second high-energy density beam to form the altered zones 13C, 13C having a thickness of 5 mm or more, it is possible to reliably generate the tensile residual stress. With the counterforce occurring as a result of the tensile residual stress, it is possible to alleviate the tensile residual stress in the vicinity of the weld toe of the weld bead 12C occurring due to the irradiation of the first high-energy density beam, or modify it into the compressive residual stress. However, in the case where the thickness exceeds 10 mm or more, the residual stress occurring due to the second high-energy density beam increases also in the plate thickness direction, possibly becoming the starting point of the fatigue breakdown. Thus, the upper limit is set to 10 mm. Depending on applications, the thickness may be set to 9 mm or less, or 8 mm or less.

In order to reduce the residual stress of the weld toe, the distance between each of the outer edges of the pair of the altered zones 13C, 13C and the center line C of the weld bead 12C may be set to 0.6 W or more. The upper limit of the distance corresponds to the sum of 2 W, which is the upper limit of the width of the altered zone, and 4 W, which is the upper limit of the inner edge distance of the altered zone, and is set to 6 W or less.

According to the weld joint 1C described above, the area having reduced tensile residual stress is formed at both of the weld toes of the weld bead 12C, and hence, excellent fatigue characteristics can be obtained. Thus, a welded structure employing the weld joint 1C can be used as a structure body or steel pipe pillar constituting a foundation portion of the tower of the wind power generator used under the giga-cycle environment.

In this embodiment, the portion disposed on both sides of the weld bead 12C and located away from the weld toe is heated to be Ac1 temperature or more. The temperature at the time of heating may be a melting temperature or more. As a result of the heating, the heated area (may include the molten portion) becomes soft, and plastically deforms due to the tensile residual stress in the vicinity of the weld toe of the weld bead 12C. This alleviates the tensile residual stress in the vicinity of the weld toe of the weld bead 12C, thereby improving the resistance to occurrence of fatigue cracks.

Next, a method of manufacturing the weld joint 1C according to this embodiment will be described in detail.

The weld joint 1C according to this embodiment is manufactured through a first irradiation step of irradiating the first high-energy density beam to a butt portion between the pair of the target metals 11C, 11C, and a second irradiation step of irradiating the second high-energy density beam to the weld joint 1C from the side from which the first high-energy density beam is irradiated. More specifically, through the first irradiation step, the weld bead 12C having the surface with a width W is formed, and through the second irradiation step, a portion having the second high-energy density beam irradiated thereto is heated to Ac1 or more to form the pair of the altered zones 13C, 13C each having a band shape extending in parallel to the weld bead 12C and located on the right side and the left side of the center (center line C) of the weld bead 12C in the width direction.

The amount of heat inputted in the second irradiation step may be set to not less than 2% and not more than 30% of the amount of heat inputted in the first irradiation step as in the method of manufacturing the weld joint 1A according to the first embodiment. However, in order to reliably obtain the altered zone having the thickness of 5 mm or more, the amount of heat inputted in the second irradiation step may be set to 5% or more, or 8% or more, or 10% or more, or 15% or more of the amount of heat inputted in the first irradiation step.

In the second irradiation step, the irradiation conditions of the second high-energy density beam are appropriately set such that each of the width, the thickness, and the separation distance of the pair of the altered zones 13C, 13C falls in the appropriate range described above. Further, depending on applications, the second high-energy density beam may be irradiated in a weaving manner. More specifically, the second high-energy density beam may be irradiated toward the longitudinal direction (Z direction) of the weld bead 12C while moving in the width direction (X direction) of the weld bead 12C. With this configuration, it is possible to form the altered zone 13C having a predetermined width to reduce the residual stress while reducing the amount of inputted heat from the irradiation of the second high-energy density beam.

The first high-energy density beam may be irradiated under the conditions, for example, of a voltage of 150V, electric current of 180 mA, and welding rate of 25 mm/min in the case where the electron beam is employed and the target material 11C has a plate thickness of 80 mm.

The second high-energy density beam may be irradiated under the conditions, for example, of a voltage of 150V and electric current of 100 mA in the case where the electron beam is employed and the target material 11C has a plate thickness of 80 mm. By adjusting the irradiation rate in the X direction and the Z direction, it is possible to obtain the altered zone having target thickness and width.

In the case where RPEBW welding is employed in the first irradiation step, the width of the weld bead 12C tends to increase as compared with the case where the welding through the electron beam is performed in the vacuum chamber under the high vacuum state. Thus, in order to stabilize the value of the fracture toughness of the weld joint 1C in the case where the RPEBW welding is employed, it is desirable to set the width of the weld bead 12C to 20% or less, or 10% or less of the plate thickness of the target metal 11C. Alternatively, it may be possible to limit the bead width to 15 mm or less, or 11 mm or less, or 7 mm or less, or 6 mm or less, or 5 mm or less.

These are the descriptions of the weld joints 1A, 1B, 1C according to the first embodiment, the second embodiment, and the third embodiment, respectively. The sizes of the altered zone of the weld joint can be easily measured by polishing the cross-section of the weld joint, for example, with an emery paper, and then subjecting the cross-section to an etching process using a nital etching solution in the range of 5% to 10% to make appear the altered zone obtained by the second high-energy density beam.

In the case where the separation distance between the pair of the altered zones is small and the altered zones are in contact with each other, the sizes of the right and left altered zones are measured on the basis of the widthwise center (center line C) of the welded metal formed with the irradiation of the first high-energy density beam.

Since the fatigue damage is likely to occur on the surface to which the first high-energy density beam is irradiated, the present invention forms the altered zone on the surface to which the first high-energy density beam is irradiated. Depending on application, it may be possible to form the altered zone on a surface to which the first high-energy density beam is not irradiated, in other words, on a rear surface side.

Further, the weld joint according the embodiments described above has the tensile residual stress $\sigma_R$ of YSb/2 or less at a position located 1 mm outward from the weld toe of the weld bead on the surface of the target material in the width direction of the weld bead, in other words, in the X direction on the surface of the target material, where the YSb is a yield strength of the target metal. In the case where the tensile residual stress $\sigma_R$ is removed and the compressive residual stress occurs, the tensile residual stress $\sigma_R$ is regarded as YSb/2 or less.

More specifically, the residual stress of a predetermined portion of the weld joint according to the embodiments described above is measured at a position located 1 mm outward from the weld toe of the weld bead, the position which is the most probable position for occurrence of the fatigue cracks, and is in the range where measurement can be reliably made with a strain gauge method, which is highly reliable as a measurement method. Since the tensile residual stress $\sigma_R$ at this position and in the direction in which the fatigue cracks are most likely to occur is reduced to ½ or less of the yield strength YSb (in other words, the maximum tensile residual stress in theory) of the steel material to be welded, the reduction in the fatigue strength can be suppressed.

However, as the method of measuring the residual stress, it may be possible to use an X-ray stress measuring, or Barkhausen method. It is desirable to measure the residual stress at a position located 1 mm outward from the right or left weld toe, and employ the higher value thereof.

The direction of measurement of the residual stress at the weld toe is not specifically limited. It is preferable to employ a strain gauge method since this method is the most accurate, and is reliable. The strain gauge method involves carrying out by attaching a strain gauge in the vicinity of a pole of the weld toe, cutting the vicinity of the strain gauge, and releasing the residual stress therearound to measure the residual stress. In the present invention, it is preferable to use a strain gauge designed for measurement of residual stress, which has a short gauge length. However, with this method, the weld joint needs to be cut into pieces for measurement. Thus, in the actual application, it is desirable to use various residual stress measurement methods capable of reproducing values measured through the strain gauge method. More specifically, it is desirable to use the X-ray stress measuring, or Barkhausen method. With these methods, variations may increase depending on the surface characteristics of the steel plate or weld joint to be measured, and hence, it is desirable to determine in advance the surface characteristics, the setting for calibration and the like so as to favorably reproduce values equivalent to values obtained through the strain gauge method.

EXAMPLES

Next, the present invention will be described on the basis of Examples. Conditions for Examples are merely examples employed for confirming implementability and effect of the present invention, but the present invention is not limited to these examples of conditions.

The present invention may employ various conditions or combinations of the conditions that can achieve the object of the present invention and do not deviate from the scope of the present invention.

First Example

Joints A1 to A31 were prepared by irradiating a first electron beam (first high-energy density beam) to a butt portion of a pair of steel plates to perform a butt welding. Table 1 shows type of steels a1, a2 and a3 of the pair of the steel plates used for the joint A1 to A31, and Table 2 shows irradiation conditions for the first electron beam.

TABLE 1

| Steel type | C | Si | Mn | Ni | Cu | Cr | Ti | Al | P | B | (mass %) S |
|---|---|---|---|---|---|---|---|---|---|---|---|
| a1 | 0.04 | 0.12 | 1.8 | 0.3 | 0.3 | — | 0.01 | 0.003 | 0.005 | — | 0.002 |
| a2 | 0.02 | 0.11 | 2.2 | 0.2 | 0.1 | — | 0.01 | 0.002 | 0.004 | 0.0009 | 0.002 |
| a3 | 0.08 | 0.22 | 1.5 | — | — | 0.1 | 0.01 | 0.003 | 0.007 | — | 0.002 |

TABLE 2

| Irradiation conditions for first electron beam | Accelerating voltage kV | Beam current mA | Welding rate cm/min | Degree of vacuum Pa |
|---|---|---|---|---|
| Wa1 | 150 | 180 | 25 | 7 |
| Wa2 | 150 | 180 | 21 | 0.07 |
| Wa3 | 150 | 170 | 15 | 0.07 |

TABLE 2-continued

| Irradiation conditions for first electron beam | Accelerating voltage kV | Beam current mA | Welding rate cm/min | Degree of vacuum Pa |
| --- | --- | --- | --- | --- |
| Wa4 | 150 | 170 | 15 | 0.07 |
| Wa5 | 150 | 150 | 10 | 7 |
| Wa6 | 150 | 180 | 10 | 0.07 |
| Wa7 | 150 | 155 | 10 | 0.07 |

For the joints A1 to A20, and A26 to A31, a second electron beam is irradiated to the same surface as the surface to which the first electron beam is irradiated to form a pair of altered zones on the surface thereof. Table 3 shows irradiation conditions for the second electron beam.

TABLE 3

| Irradiation conditions for second electron beam | Accelerating voltage kV | Beam current mA | Welding rate cm/min | Degree of vacuum Pa |
| --- | --- | --- | --- | --- |
| Ea1 | 150 | 100 | 55 | 7 |
| Ea2 | 150 | 180 | 80 | 0.07 |
| Ea3 | 150 | 170 | 80 | 0.07 |
| Ea4 | 150 | 170 | 50 | 7 |

TABLE 3-continued

| Irradiation conditions for second electron beam | Accelerating voltage kV | Beam current mA | Welding rate cm/min | Degree of vacuum Pa |
| --- | --- | --- | --- | --- |
| Ea5 | 150 | 150 | 65 | 0.07 |
| Ea6 | 150 | 180 | 15 | 0.07 |
| Ea7 | 150 | 155 | 20 | 0.07 |

Table 4 shows details of the joints A1 to A31 prepared as described above.

Sizes of right and left altered zones shown in Table 4 are measured after cross-sections of the joints were polished with an emery paper, and then the cross-sections were subjected to etching using a 5% nital etching solution to make appear the right and left altered zones. The presence/absence of the molten and solidified portion was determined from the cross-sections of the altered zones made to appear as described above.

An inner edge distance represents a distance between the inner edge of each of the right and the left altered zones and the center of the weld bead in the width direction.

An outer edge distance represents a distance between the outer edge of each of the right and the left altered zones and the center of the weld bead in the width direction.

TABLE 4

| | Steel material | | First electron beam | | Second electron beam | | | | | | | | | | | | | | | | | |
|---|---|---|---|---|---|---|---|---|---|---|---|---|---|---|---|---|---|---|---|---|---|---|
| | | | | | | | Altered zone on left side | | | | | | Altered zone on right side | | | | | | | |
| | Type of steel | Plate thickness mm | Welding condition | Width W of weld bead mm | Irradiation condition | Width mm | Width/ W | Thick- ness mm | Inner edge distance mm | Inner edge distance/W | Outer edge distance/W | Width mm | Width/ W | Thick- ness mm | Inner edge distance mm | Inner edge distance/W | Outer edge distance/W | Presence/ absence of the molten and solidified portion | Input heat ratio % |
| Joint A1 | a1 | 50 | Wa1 | 3.5 | Ea1 | 2.20 | 0.63 | 0.21 | 0.00 | 0.00 | 0.63 | 2.20 | 0.63 | 0.21 | 0.00 | 0.00 | 0.63 | Absent | 2 |
| Joint A2 | a1 | 50 | Wa1 | 3.5 | Ea1 | 2.51 | 0.72 | 0.21 | 0.00 | 0.00 | 0.72 | 2.52 | 0.72 | 0.22 | 0.00 | 0.00 | 0.72 | Absent | 14 |
| Joint A3 | a1 | 50 | Wa2 | 4.8 | Ea2 | 4.02 | 0.84 | 0.11 | 0.00 | 0.00 | 0.84 | 4.02 | 0.84 | 0.11 | 0.00 | 0.00 | 0.84 | Absent | 2 |
| Joint A4 | a1 | 50 | Wa3 | 4.8 | Ea3 | 6.01 | 1.25 | 0.21 | 0.00 | 0.00 | 1.25 | 6.03 | 1.26 | 0.20 | 0.00 | 0.00 | 1.26 | Absent | 3 |
| Joint A5 | a1 | 50 | Wa4 | 5.1 | Ea4 | 7.50 | 1.47 | 0.20 | 0.00 | 0.00 | 1.47 | 7.51 | 1.47 | 0.21 | 0.00 | 0.00 | 1.47 | Absent | 3 |
| Joint A6 | a1 | 120 | Wa5 | 5.5 | Ea5 | 9.98 | 1.81 | 0.52 | 0.00 | 0.00 | 1.81 | 9.99 | 1.82 | 0.50 | 0.00 | 0.00 | 1.82 | Absent | 3 |
| Joint A7 | a2 | 80 | Wa6 | 5.4 | Ea6 | 7.50 | 1.39 | 0.29 | 0.00 | 0.00 | 1.39 | 7.49 | 1.39 | 0.28 | 0.00 | 0.00 | 1.39 | Absent | 10 |
| Joint A8 | a3 | 100 | Wa7 | 7.2 | Ea7 | 7.51 | 1.04 | 0.30 | 0.00 | 0.00 | 1.04 | 7.53 | 1.05 | 0.31 | 0.00 | 0.00 | 1.05 | Absent | 3 |
| Joint A9 | a1 | 50 | Wa1 | 4.0 | Ea1 | 2.20 | 0.55 | 0.10 | 0.00 | 0.00 | 1.14 | 2.20 | 0.55 | 0.10 | 0.00 | 0.00 | 1.14 | Absent | 2 |
| Joint A10 | a1 | 80 | Wa4 | 5.1 | Ea4 | 2.00 | 0.39 | 0.20 | 2.37 | 0.59 | 0.78 | 2.00 | 0.39 | 0.21 | 2.37 | 0.59 | 0.78 | Absent | 2 |
| Joint A11 | a1 | 80 | Wa4 | 5.2 | Ea4 | 7.30 | 1.40 | 1.10 | 2.00 | 0.39 | 1.40 | 7.51 | 1.44 | 1.10 | 2.00 | 0.39 | 1.44 | Present | 2 |
| Joint A12 | a1 | 80 | Wa4 | 5.2 | Ea4 | 7.20 | 1.38 | 0.70 | 0.00 | 0.00 | 1.38 | 7.51 | 1.44 | 0.80 | 0.00 | 0.00 | 1.44 | Present | 6 |
| Joint A13 | a1 | 80 | Wa4 | 5.1 | Ea4 | 1.00 | 0.20 | 0.90 | 2.30 | 0.45 | 0.65 | 1.00 | 0.20 | 0.90 | 2.30 | 0.45 | 0.65 | Present | 4.0 |
| Joint A14 | a1 | 80 | Wa4 | 5.3 | Ea4 | 0.90 | 0.17 | 0.30 | 2.40 | 0.45 | 0.62 | 1.50 | 0.28 | 0.30 | 2.10 | 0.40 | 0.68 | Absent | 2.0 |
| Joint A15 | a1 | 80 | Wa4 | 5.2 | Ea4 | 7.20 | 1.38 | 0.20 | 3.00 | 0.58 | 1.96 | 7.51 | 1.44 | 0.21 | 3.00 | 0.58 | 2.02 | Absent | 2 |
| Joint A16 | a1 | 80 | Wa4 | 5.1 | Ea4 | 7.50 | 1.47 | 1.20 | 0.00 | 0.00 | 1.47 | 7.51 | 1.47 | 1.50 | 0.00 | 0.00 | 1.47 | Present | 6 |
| Joint A17 | a1 | 80 | Wa4 | 5.1 | Ea4 | 11.00 | 2.16 | 0.20 | 0.00 | 0.00 | 2.16 | 10.80 | 2.12 | 0.21 | 0.00 | 0.00 | 2.12 | Absent | 4 |
| Joint A18 | a1 | 50 | Wa1 | 8.0 | Ea1 | 5.10 | 0.64 | 0.21 | 0.00 | 0.00 | 0.64 | 5.10 | 0.64 | 0.22 | 0.00 | 0.00 | 0.64 | Absent | 3 |
| Joint A19 | a1 | 80 | Wa5 | 9.1 | Ea4 | 9.90 | 1.09 | 0.52 | 0.00 | 0.00 | 1.09 | 9.95 | 1.09 | 0.50 | 0.00 | 0.00 | 1.09 | Absent | 2 |
| Joint A20 | a3 | 100 | Wa5 | 10.2 | Ea4 | 12.50 | 1.23 | 0.32 | 0.00 | 0.00 | 1.23 | 12.43 | 1.22 | 0.31 | 0.00 | 0.00 | 1.22 | Absent | 3 |
| Joint A21 | a1 | 50 | Wa1 | 3.5 | — | — | — | — | — | — | — | — | — | — | — | — | — | — | — |
| Joint A22 | a1 | 80 | Wa4 | 4.8 | — | — | — | — | — | — | — | — | — | — | — | — | — | — | — |
| Joint A23 | a1 | 120 | Wa5 | 6.2 | — | — | — | — | — | — | — | — | — | — | — | — | — | — | — |
| Joint A24 | a2 | 80 | Wa6 | 5.4 | — | — | — | — | — | — | — | — | — | — | — | — | — | — | — |
| Joint A25 | a3 | 100 | Wa7 | 7.2 | — | — | — | — | — | — | — | — | — | — | — | — | — | — | — |
| Joint A26 | a1 | 50 | Wa1 | 2.8 | Ea1 | 0.28 | 0.08 | 0.21 | 0.00 | 0.00 | 0.10 | 0.27 | 0.08 | 0.22 | 0.00 | 0.00 | 0.10 | Absent | 2 |
| Joint A27 | a1 | 50 | Wa1 | 3.5 | Ea1 | 2.03 | 0.58 | 0.08 | 0.00 | 0.00 | 0.58 | 2.01 | 0.57 | 0.08 | 0.00 | 0.00 | 0.57 | Absent | 1.8 |
| Joint A28 | a1 | 50 | Wa1 | 3.5 | Ea1 | 2.01 | 0.57 | 12 | 1.10 | 0.31 | 0.89 | 1.99 | 0.57 | 12 | 1.10 | 0.31 | 0.88 | Present | 32 |
| Joint A29 | a1 | 50 | Wa1 | 3.5 | Ea1 | 2.00 | 0.62 | 0.32 | 14.20 | 4.06 | 4.63 | 2.01 | 0.62 | 0.31 | 14.30 | 4.09 | 4.66 | Absent | 3 |
| Joint A30 | a1 | 50 | Wa1 | 3.5 | Ea1 | 0.50 | 0.14 | 0.25 | 0.00 | 0.00 | 0.14 | 0.28 | 0.08 | 0.25 | 0.00 | 0.00 | 0.08 | Absent | 2 |
| Joint A31 | a1 | 80 | Wa4 | 5.1 | Ea4 | 0.40 | 0.08 | 0.08 | 0.00 | 0.00 | 0.08 | 0.40 | 0.08 | 0.08 | 0.00 | 0.00 | 0.08 | Absent | 0.7 |

Table 5 shows "residual-stress measured value $\sigma_R$ at a position located 1 mm outward from weld toe," "yield strength Ysb of base material," and properties of the joints including "$2\times10^6$ times fatigue strength of joint," "reduction ratio under ultrasonic fatigue test," and "fatigue strength of joint under giga-cycle" for the joints A1 to A31.

TABLE 5

| | Residual-stress measured value $\sigma_R$ at a position located 1 mm outward from weld toe MPa | Yield strength Ysb of base material MPa | Properties of joint | | |
|---|---|---|---|---|---|
| | | | $2 \times 10^6$ times fatigue strength of joint MPa | Reduction ratio under ultrasonic fatigue test % | Fatigue strength of joint under gigacycle MPa |
| Joint A1 | 120 | 415 | 240 | 90 | 216 |
| Joint A2 | 90 | 415 | 250 | 86 | 215 |
| Joint A3 | 180 | 415 | 215 | 83 | 178 |
| Joint A4 | 60 | 415 | 220 | 87 | 191 |
| Joint A5 | 100 | 383 | 250 | 86 | 215 |
| Joint A6 | 5 | 364 | 250 | 88 | 220 |
| Joint A7 | 80 | 390 | 230 | 90 | 207 |
| Joint A8 | 150 | 425 | 232 | 86 | 200 |
| Joint A9 | 200 | 415 | 205 | 84 | 172 |
| Joint A10 | 190 | 383 | 188 | 86 | 162 |
| Joint A11 | 190 | 383 | 188 | 86 | 162 |
| Joint A12 | 187 | 383 | 186 | 86 | 160 |
| Joint A13 | 188 | 383 | 190 | 86 | 163 |
| Joint A14 | 190 | 383 | 192 | 86 | 165 |
| Joint A15 | 186 | 383 | 188 | 86 | 162 |
| Joint A16 | 190 | 383 | 191 | 86 | 164 |
| Joint A17 | 150 | 383 | 205 | 86 | 176 |
| Joint A18 | 90 | 415 | 242 | 85 | 206 |
| Joint A19 | 150 | 383 | 211 | 82 | 173 |
| Joint A20 | 60 | 425 | 215 | 86 | 185 |
| Joint A21 | 235 | 415 | 150 | 88 | 132 |
| Joint A22 | 250 | 383 | 160 | 86 | 138 |
| Joint A23 | 215 | 364 | 160 | 83 | 133 |
| Joint A24 | 280 | 390 | 155 | 82 | 127 |
| Joint A25 | 280 | 425 | 160 | 75 | 120 |
| Joint A26 | 250 | 415 | 160 | 86 | 138 |
| Joint A27 | 280 | 415 | 162 | 88 | 143 |
| Joint A28 | 280 | 415 | 160 | 87 | 139 |
| Joint A29 | 280 | 415 | 150 | 85 | 128 |
| Joint A30 | 240 | 415 | 160 | 86 | 138 |
| Joint A31 | 290 | 383 | 160 | 86 | 138 |

The "residual-stress measured value $\sigma_R$ at a position located 1 mm outward from weld toe" is a value obtained by measuring the residual stress at the position located 1 mm outward from the weld toe through the strain gauge method.

Figure 6:
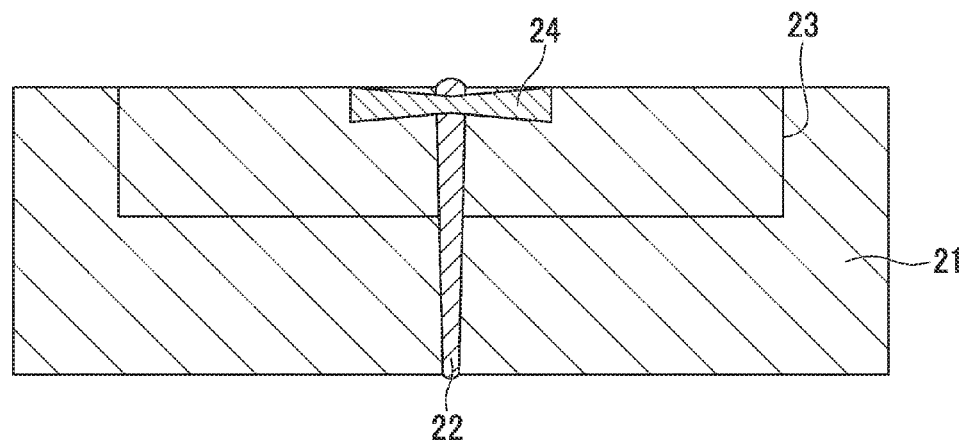
FIG. 6 is a sectional schematic view illustrating a position at which a test sample for a fatigue test is taken.

The "$2\times10^6$ times fatigue strength of joint" is obtained by taking fatigue test pieces 23 of a joint from a position illustrated in FIG. 6, machine polishing the rear surface of the fatigue test pieces 23 of the joint so that fatigue cracking occurs from the front surface side of the test pieces, and implementing a fatigue test under conditions of axial force/stress of 0.1 and repeating speed of 5 Hz.

The values of "reduction ratio under ultrasonic fatigue test" are obtained by implementing an ultrasonic fatigue test for ultrasonic test pieces 24 taken from the position illustrated in FIG. 6, obtaining the fatigue strength for $2\times10^6$ times and the fatigue strength for $2\times10^9$ times, and calculating the reduction ratio therebetween.

The "fatigue strength of joint under giga-cycle" is estimated values obtained by calculation on the basis of the "$2\times10^6$ times fatigue strength of joint" and the "reduction ratio under ultrasonic fatigue test."

As can be seen from Table 4 and Table 5, in the joints A1 to A20, the altered zones having appropriate sizes were formed on the right and the left of the center of the weld bead in the width direction by irradiating the second electron beam, and hence, favorable joint characteristics can be obtained.

On the other hand, in the joints A21 to A25, the second electron beam was not irradiated. Thus, the tensile residual stress was not alleviated in the vicinity of the weld toe of the weld bead occurring due to the irradiation of the first electron beam, and the favorable joint characteristics could not be obtained.

In the joints A26 to A31, although the second electron beam was irradiated, the favorable joint characteristics could not be obtained since the right and left altered zones formed by the irradiation of the second electron beam did not have the appropriate sizes.

In the joint A26, the widths of the right and left altered zones were small as compared with the bead width W, and hence, the tensile residual stress in the vicinity of the weld toe of the weld bead could not be sufficiently alleviated.

In the joint A27, the thicknesses of the right and left altered zones were small, and hence, the tensile residual stress in the vicinity of the weld toe of the weld bead could not be sufficiently alleviated.

In the joint A28, the thicknesses of the right and left altered zones were large, and hence, the joint characteristics deteriorated due to the tensile residual stress occurring due to the irradiation of the second electron beam.

In the joint A29, the inner edge distance was large, in other words, the right and left altered zones were largely spaced from the weld toe of the bead, and hence, the tensile residual stress in the vicinity of the weld toe of the weld bead could not be sufficiently alleviated.

In the joint A30, the width of the right altered zone was smaller relative to the bead width, and hence, the tensile residual stress in the vicinity of the weld toe of the weld bead could not be sufficiently alleviated.

In the joint A31, the width, the thickness, and the outer edge distance of the right and left altered zones were small, and hence, the tensile residual stress in the vicinity of the weld toe of the weld bead could not be sufficiently alleviated.

Second Example

Joints B1 to B30 were prepared by irradiating a first electron beam (first high-energy density beam) to a butt portion of a pair of steel plates to perform a butt welding. Table 6 shows type of steels b1, b2 and b3 of the pair of the steel plates used for the joint B1 to B30, and Table 7 shows irradiation conditions for the first electron beam.

TABLE 6

| Steel type | C | Si | Mn | Ni | Cu | Cr | Ti | Al | P | B | S |
|---|---|---|---|---|---|---|---|---|---|---|---|
| | | | | | | | | | | | (mass %) |
| b1 | 0.1 | 0.41 | 1.2 | 0.5 | — | 0.2 | — | 0.003 | 0.003 | — | 0.003 |
| b2 | 0.2 | 0.25 | 1.5 | 1.1 | — | 0.2 | — | 0.003 | 0.003 | — | 0.004 |
| b3 | 0.05 | 0.21 | 2.1 | 0.5 | — | 0 | — | 0.01 | 0.004 | — | 0.004 |

TABLE 7

| Irradiation conditions for first electron beam | Accelerating voltage kV | Beam current mA | Welding rate cm/min | Degree of vacuum Pa |
|---|---|---|---|---|
| Wb1 | 150 | 180 | 25 | 7 |
| Wb2 | 150 | 220 | 25 | 0.07 |

TABLE 7-continued

| Irradiation conditions for first electron beam | Accelerating voltage kV | Beam current mA | Welding rate cm/min | Degree of vacuum Pa |
| --- | --- | --- | --- | --- |
| Wb3 | 150 | 260 | 25 | 0.07 |
| Wb4 | 150 | 170 | 15 | 0.07 |
| Wb5 | 150 | 220 | 10 | 7 |
| Wb6 | 150 | 270 | 10 | 0.007 |

For the joints B1 to B30, a second electron beam is irradiated to the same surface as the surface to which the first electron beam is irradiated to form a pair of altered zones on this surface. Table 8 shows irradiation conditions for the second electron beam.

TABLE 8

| Irradiation conditions for second electron beam | Accelerating voltage kV | Beam current mA | Welding rate cm/min | Degree of vacuum Pa |
| --- | --- | --- | --- | --- |
| Eb1 | 90 | 40 | 55 | 7 |

TABLE 8-continued

| Irradiation conditions for second electron beam | Accelerating voltage kV | Beam current mA | Welding rate cm/min | Degree of vacuum Pa |
| --- | --- | --- | --- | --- |
| Eb2 | 90 | 40 | 50 | 7 |
| Eb3 | 90 | 40 | 38 | 0.07 |

Table 9 shows details of the joints B1 to B30 prepared as described above.

Sizes of right and left altered zones shown in Table 4 are measured after cross-sections of the joints were polished with an emery paper, and then the cross-sections were subjected to etching using a 5% nital etching solution to make appear the right and left altered zones. The presence/absence of the molten and solidified portion was determined from the cross-sections of the altered zones made appear as described above.

An inner edge distance represents a distance between the inner edge of each of the right and the left altered zones and the center of the weld bead in the width direction.

An outer edge distance represents a distance between the outer edge of each of the right and the left altered zones and the center of the weld bead in the width direction.

TABLE 9

| | Steel material | | First electron beam | | Second electron beam | | | | | | | | | | | | | | | |
|---|---|---|---|---|---|---|---|---|---|---|---|---|---|---|---|---|---|---|---|---|
| | | | | | | | Altered zone on left side | | | | | | Altered zone on right side | | | | | | Presence/absence of the molten and solidified portion | Input heat ratio % |
| | Type of steel | Plate thickness mm | Welding condition | Width W of weld bead mm | Irradiation condition | Width mm | Width/W | Thickness mm | Inner edge distance mm | Inner edge distance/W | Outer edge distance/W | Width mm | Width/W | Thickness mm | Inner edge distance mm | Inner edge distance/W | Outer edge distance/W | | |
| Joint B1 | b1 | 50 | Wb1 | 10.0 | Eb1 | 1.21 | 0.12 | 8.05 | 20 | 2.00 | 2.12 | 1.20 | 0.12 | 8.03 | 20 | 2.00 | 2.12 | Present | 5 |
| Joint B2 | b1 | 50 | Wb1 | 10.0 | Eb2 | 6.03 | 0.60 | 8.02 | 20 | 2.00 | 2.60 | 6.05 | 0.61 | 8.04 | 20 | 2.00 | 2.61 | Present | 12 |
| Joint B3 | b1 | 50 | Wb1 | 11.0 | Eb3 | 8.80 | 0.80 | 7.02 | 22 | 2.00 | 2.80 | 8.74 | 0.79 | 7.03 | 22 | 2.00 | 2.79 | Present | 12 |
| Joint B4 | b1 | 50 | Wb2 | 13.0 | Eb3 | 10.42 | 0.80 | 7.05 | 26 | 2.00 | 2.80 | 10.42 | 0.80 | 7.02 | 26 | 2.00 | 2.80 | Present | 13 |
| Joint B5 | b1 | 50 | Wb3 | 15.0 | Eb2 | 12.01 | 0.80 | 6.95 | 60 | 4.00 | 4.80 | 12.03 | 0.80 | 7.01 | 60 | 4.00 | 4.80 | Present | 10 |
| Joint B6 | b3 | 80 | Wb4 | 11.0 | Eb1 | 2.22 | 0.20 | 10.05 | 33 | 3.00 | 3.20 | 2.23 | 0.20 | 9.81 | 33 | 3.00 | 3.20 | Present | 5 |
| Joint B7 | b3 | 80 | Wb4 | 11.0 | Eb2 | 8.80 | 0.80 | 8.02 | 33 | 3.00 | 3.80 | 8.81 | 0.80 | 8.06 | 33 | 3.00 | 3.80 | Present | 10 |
| Joint B8 | b3 | 100 | Wb5 | 11.0 | Eb1 | 8.81 | 0.80 | 10.01 | 33 | 3.00 | 3.80 | 8.82 | 0.80 | 9.81 | 33 | 3.00 | 3.80 | Present | 10 |
| Joint B9 | b1 | 100 | Wb5 | 11.0 | Eb3 | 8.78 | 0.80 | 8.05 | 22 | 2.00 | 2.80 | 8.80 | 0.80 | 9.92 | 22 | 2.00 | 2.80 | Present | 7 |
| Joint B10 | b2 | 50 | Wb6 | 13.0 | Eb1 | 10.41 | 0.80 | 8.04 | 26 | 2.00 | 2.80 | 10.44 | 0.80 | 8.03 | 26 | 2.00 | 2.80 | Present | 6 |
| Joint B11 | b1 | 50 | Wb2 | 13.0 | Eb1 | 23.43 | 1.80 | 10.03 | 26 | 2.00 | 3.80 | 23.45 | 1.80 | 8.01 | 26 | 2.00 | 3.80 | Present | 30 |
| Joint B12 | b2 | 50 | Wb3 | 15.0 | Eb1 | 30.02 | 2.00 | 10.04 | 60 | 4.00 | 6.00 | 30.08 | 2.01 | 9.85 | 60 | 4.00 | 6.01 | Present | 29 |
| Joint B13 | b3 | 50 | Wb1 | 10.0 | Eb2 | 8.01 | 0.80 | 10.00 | 10 | 1.00 | 1.80 | 7.99 | 0.80 | 9.88 | 10 | 1.00 | 1.80 | Present | 19 |
| Joint B14 | b1 | 50 | Wb1 | 10.0 | Eb1 | 8.03 | 0.80 | 5.00 | 20 | 2.00 | 2.80 | 8.00 | 0.80 | 5.00 | 20 | 2.00 | 2.80 | Present | 12 |
| Joint B15 | b3 | 80 | Wb5 | 11.0 | Eb1 | 8.81 | 0.80 | 7.02 | 22 | 2.00 | 2.80 | 8.84 | 0.80 | 7.00 | 22 | 2.00 | 2.80 | Present | 9 |
| Joint B16 | b2 | 100 | Wb6 | 11.0 | Eb3 | 11.00 | 1.00 | 10.05 | 22 | 2.00 | 3.00 | 11.02 | 1.00 | 9.82 | 22 | 2.00 | 3.00 | Present | 10 |
| Joint B17 | b1 | 100 | Wb2 | 13.0 | Eb1 | 23.41 | 1.80 | 9.02 | 26 | 2.00 | 3.80 | 23.43 | 1.80 | 9.00 | 26 | 2.00 | 3.80 | Present | 15 |
| Joint B18 | b2 | 80 | Wb2 | 6.0 | Eb3 | 8.81 | 1.47 | 7.02 | 11 | 1.83 | 3.30 | 8.84 | 1.47 | 7.00 | 11 | 1.83 | 3.31 | Present | 12 |
| Joint B19 | b2 | 50 | Wb2 | 4.2 | Eb3 | 4.02 | 0.96 | 5.30 | 13 | 3.10 | 4.05 | 4.10 | 0.98 | 5.25 | 13 | 3.10 | 4.07 | Present | 12 |
| Joint B20 | b3 | 80 | Wb4 | 7.1 | Eb3 | 10.10 | 1.42 | 9.10 | 10 | 1.41 | 2.83 | 10.30 | 1.45 | 8.91 | 9 | 1.27 | 2.72 | Present | 12 |
| Joint B21 | b2 | 100 | Wb4 | 5.7 | Eb3 | 6.00 | 1.05 | 6.20 | 12 | 2.11 | 3.16 | 5.93 | 1.04 | 6.34 | 13 | 2.28 | 3.32 | Present | 12 |
| Joint B22 | b1 | 100 | Wb6 | 10.0 | Eb1 | 25.00 | 2.50 | 2.00 | 26 | 2.60 | 5.10 | 10.44 | 1.04 | 2.00 | 26 | 2.60 | 3.64 | Absent | 6 |
| Joint B23 | b2 | 80 | Wb2 | 13.0 | Eb1 | 23.43 | 1.80 | 3.00 | 26 | 2.00 | 3.80 | 23.45 | 1.80 | 3.00 | 26 | 2.00 | 3.80 | Absent | 12 |
| Joint B24 | b2 | 50 | Wb3 | 15.0 | Eb1 | 30.02 | 2.00 | 10.04 | 12 | 0.80 | 2.80 | 30.08 | 2.01 | 9.85 | 12 | 0.80 | 2.81 | Present | 29 |
| Joint B25 | b3 | 50 | Wb1 | 10.0 | Eb2 | 8.01 | 0.80 | 10.00 | 9 | 0.90 | 1.70 | 7.99 | 0.80 | 9.88 | 9 | 0.90 | 1.70 | Present | 19 |
| Joint B26 | b1 | 50 | Wb1 | 10.0 | Eb1 | 22.00 | 2.20 | 5.00 | 20 | 2.00 | 4.20 | 105.00 | 10.50 | 5.00 | 20 | 2.00 | 12.50 | Present | 70 |
| Joint B27 | b2 | 80 | Wb4 | 11.0 | Eb1 | 8.81 | 0.80 | 0.08 | 22 | 2.00 | 2.80 | 8.84 | 0.80 | 0.08 | 22 | 2.00 | 2.80 | Absent | 1 |
| Joint B28 | b2 | 80 | Wb4 | 11.0 | Eb3 | 1.00 | 0.09 | 7.02 | 22 | 2.00 | 2.09 | 1.00 | 0.09 | 7.00 | 22 | 2.00 | 2.09 | Absent | 1 |
| Joint B29 | b2 | 100 | Wb5 | 11.0 | Eb1 | 11.00 | 1.00 | 12.00 | 22 | 2.00 | 3.00 | 11.02 | 1.00 | 12.00 | 22 | 2.00 | 3.00 | Present | 14 |
| Joint B30 | b1 | 100 | Wb6 | 13.0 | Eb1 | 23.41 | 1.80 | 9.02 | 55 | 4.23 | 6.03 | 23.43 | 1.80 | 9.00 | 55 | 4.23 | 6.03 | Present | 15 |

Table 10 shows "residual-stress measured value $\sigma_R$ at a position located 1 mm outward from weld toe," "yield strength Ysb of base material," and properties of the joints including "$2\times10^6$ times fatigue strength of joint," "reduction ratio under ultrasonic fatigue test," and "fatigue strength of joint under giga-cycle" for the joints B1 to B30.

TABLE 10

| | Residual-stress measured value $\sigma_R$ at a position located 1 mm outward from weld toe MPa | Yield strength Ysb of base material MPa | Properties of joint | | |
|---|---|---|---|---|---|
| | | | $2 \times 10^6$ times fatigue strength of joint MPa | Reduction ratio under ultrasonic fatigue test % | Fatigue strength of joint under gigacycle MPa |
| Joint B1 | −320 | 482 | 241 | 81 | 195 |
| Joint B2 | −300 | 487 | 245 | 95 | 233 |
| Joint B3 | −30 | 477 | 241 | 95 | 229 |
| Joint B4 | −50 | 441 | 221 | 94 | 208 |
| Joint B5 | −70 | 421 | 215 | 87 | 187 |
| Joint B6 | −200 | 476 | 240 | 86 | 206 |
| Joint B7 | −40 | 431 | 220 | 97 | 213 |
| Joint B8 | −50 | 488 | 245 | 94 | 230 |
| Joint B9 | −100 | 552 | 275 | 93 | 256 |
| Joint B10 | −200 | 490 | 245 | 88 | 216 |
| Joint B11 | −470 | 475 | 240 | 86 | 206 |
| Joint B12 | −460 | 470 | 235 | 89 | 209 |
| Joint B13 | −200 | 428 | 235 | 78 | 183 |
| Joint B14 | −220 | 487 | 245 | 67 | 164 |
| Joint B15 | −100 | 558 | 280 | 79 | 221 |
| Joint B16 | −380 | 563 | 282 | 91 | 257 |
| Joint B17 | −380 | 479 | 240 | 71 | 170 |
| Joint B18 | −280 | 558 | 243 | 73 | 177 |
| Joint B19 | −200 | 487 | 255 | 75 | 191 |
| Joint B20 | −230 | 431 | 263 | 72 | 189 |
| Joint B21 | −190 | 563 | 241 | 74 | 178 |
| Joint B22 | 240 | 490 | 180 | 88 | 158 |
| Joint B23 | 230 | 475 | 190 | 86 | 163 |
| Joint B24 | 225 | 470 | 185 | 89 | 165 |
| Joint B25 | 200 | 428 | 190 | 78 | 148 |
| Joint B26 | 390 | 487 | 130 | 67 | 87 |
| Joint B27 | 356 | 558 | 165 | 79 | 130 |
| Joint B28 | 345 | 558 | 165 | 79 | 130 |
| Joint B29 | 310 | 563 | 135 | 91 | 123 |
| Joint B30 | 290 | 479 | 130 | 71 | 92 |

The "residual-stress measured value $\sigma_R$ at a position located 1 mm outward from weld toe" is a value obtained by measuring the residual stress at the position located 1 mm outward from the weld toe through the strain gauge method.

The "$2\times10^6$ times fatigue strength of joint" is obtained by taking fatigue test pieces 23 of a joint from a position illustrated in FIG. 6, machine polishing the rear surface of the fatigue test pieces 23 of the joint so that fatigue cracking occurs from the front surface side of the test pieces, and implementing a fatigue test under conditions of axial force/stress of 0.1 and repeating speed of 5 Hz.

The values of "reduction ratio under ultrasonic fatigue test" are obtained by implementing an ultrasonic fatigue test for ultrasonic test pieces 24 taken from the position illustrated in FIG. 6, obtaining the fatigue strength for $2\times10^6$ times and the fatigue strength for $2\times10^9$ times, and calculating the reduction ratio there between. More specifically, the values are obtained by dividing the fatigue strength for $2\times10^9$ times by the fatigue strength for $2\times10^6$ times.

The "fatigue strength of joint under giga-cycle" is an estimated value obtained by calculation on the basis of the "$2\times10^6$ times fatigue strength of joint" and the "reduction ratio under ultrasonic fatigue test."

As can be seen from Table 9 and Table 10, it can be known that, in the joints B1 to B25, the altered zones having appropriate sizes were formed on the right and the left of the center of the weld bead in the width direction by irradiating the second electron beam, and hence, favorable joint characteristics can be obtained.

In the joints B26 to B30, the favorable joint characteristics could not be obtained since the right and left altered zones did not have the appropriate sizes.

In the joint B26, the amount of heat inputted through the irradiation of the second electron beam is large, and the width of the right altered zone was excessively large. Thus, the joint characteristic could not be sufficiently obtained due to the effect of the tensile residual stress occurring at the irradiated portion.

In the joint B27, the thicknesses of the right and left altered zones were small, and hence, the tensile residual stress in the vicinity of the weld toe of the weld bead could not be sufficiently alleviated.

In the joint B28, the widths of the right and left altered zones were larger relative to the bead width, and hence, the tensile residual stress in the vicinity of the weld toe of the weld bead could not be sufficiently alleviated.

In the joint B29, the thicknesses of the right and left altered zones are large, and hence, the joint characteristic deteriorated due to the tensile residual stress occurring due to the irradiation of the second electron beam.

In the joint B30, the inner edge distance was large, in other words, the right and left altered zones were largely spaced from the weld toe of the bead, and hence, the tensile residual stress in the vicinity of the weld toe of the weld bead could not be sufficiently alleviated.

According to the present invention, it is possible to form a weld joint having fatigue resistance against vibration in the giga-cycle range, and sufficiently high fracture toughness value $\delta c$. Thus, the weld joint according to the present invention has high industrial applicability as a weld joint of a foundation member of a tower of an off-shore wind power generator.

REFERENCE SIGNS LIST 1A, 1A', 1B, 1C Weld joint
11A, 11A', 11B, 11C Target metal (base material for welding)
12A, 12A', 12B, 12C Weld bead
13A, 13A', 13B, 13C Altered zone
23 Joint fatigue test piece
24 Ultrasonic fatigue test piece
W Width of weld bead

The invention claimed is:

1. A butt-welded joint of a welded structure, comprising:
a pair of target metals, which are high-strength steel plates having a plate thickness exceeding 30 mm;
only a single weld bead formed by irradiating a first high-energy density beam to a butt portion between the pair of the target metals, the weld bead being formed along a boundary line of the butt portion, wherein the weld bead has a width W on a first surface of the butt-welded joint to which the first high-energy density beam is irradiated, and a width W2 on a second surface of the butt-welded joint which is opposite to the first surface, and wherein W2 is not larger than W; and
a pair of heat-affected zones formed by irradiating a second high-energy density beam to the first surface on a right side and a left side of a center of the weld bead in a weld bead width direction, wherein the pair of the heat-affected zones having a band shape extending in the weld bead length direction, and the pair of the heat-affected zones being located on the right side and the left side relative to the center of the weld bead in the width direction, wherein each of the pair of the heat-affected zones has a width of not less than 0.1 W and not more than 10 W, and a thickness of not less than 0.1 mm and not more than 0.5 mm, a distance between each inner edge of the pair of the heat-affected zones and the center of the weld bead in the width direction is not less than 0 and not more than 0.4 W on the first surface, a distance between each outer edge of the pair of the heat-affected zones and the center of the weld bead in the width direction is not less than 0.6 W and not more than 14 W, and a tensile residual stress $\sigma_R$ in a direction perpendicular to the weld bead on a surface of the target metal is not more than YSb/2 at a position located 1 mm outward from a weld toe of the weld bead on a surface of the target metal having the first high-energy density beam irradiated thereto, where YSb represents a yield strength of the target material.

2. The butt-welded joint of a welded structure according to claim 1, wherein the welded structure is a structure body or a steel pipe pillar constituting a foundation portion of a tower of a wind power generator.

3. A method for manufacturing a butt-welded joint of a welded structure, the method including:

irradiating a first high-energy density beam to a butt portion between a pair of target metals, which are high-strength steel plates having a plate thickness exceeding 30 mm, on a first surface of the pair of the target metals to form only a single weld bead along a boundary line of the butt portion, wherein the weld bead has a width of W on the first surface and a width of W2 on a second surface of the pair of target metals that is opposite to the first surface, and wherein W2 is not larger than W, in a first irradiation step; and irradiating a second high-energy density beam to a right side and a left side of a center of the weld bead formed by the first high-energy density beam in a weld bead width direction, to heat an irradiated portion to a temperature not less than Ac1 and less than a melting temperature to form a pair of heat-affected zones having a band shape extending in the weld bead length direction in a second irradiation step, the pair of the heat-affected zones being located on the right side and the left side relative to the center of the weld bead in the width direction, whereby a tensile residual stress in the vicinity of a weld toe of the weld bead caused by the irradiation of the first high-energy density beam is alleviated, or modified into the compressive residual stress, and wherein an amount of heat inputted in the second irradiation step is not less than 2% and not more than 30% of the amount of heat inputted in the first irradiation step, each of the pair of the heat-affected zones has a width of not less than 0.1 W and not more than 10 W, and a thickness of not less than 0.1 mm and not more than 0.5 mm, a distance between each inner edge of the pair of the heat-affected zones and the center of the weld bead in the width direction is not less than 0 and not more than 0.4 W on the first surface, and a distance between each outer edge of the pair of the heat-affected zones and the center of the weld bead in the width direction is not less than 0.6 W and not more than 14 W.

4. The method for manufacturing a butt-welded joint of a welded structure according to claim 3, wherein the welded structure is a structure body or a steel pipe pillar constituting a foundation portion of a tower of a wind power generator.

5. A butt-welded joint of a welded structure, comprising:

a pair of target metals, which are high-strength steel plates having a plate thickness exceeding 30 mm;

only a single weld bead formed by irradiating a first high-energy density beam to a butt portion between the pair of the target metals, the weld bead being formed along a boundary line of the butt portion, wherein the weld bead has a width W on a first surface of the butt-welded joint to which the first high-energy density beam is irradiated, and a width W2 on a second surface of the butt-welded joint which is opposite to the first surface, and wherein W2 is not larger than W; and a pair of heat-affected zones formed by irradiating a second high-energy density beam to the first surface on a right side and a left side of a center of the weld bead in a weld bead width direction, wherein the pair of the heat-affected zones having a band shape extending in the weld bead length direction, and the pair of the heat-affected zones being located on the right side and the left side relative to the center of the weld bead in the width direction, wherein each of the pair of the heat-affected zones has a width of not less than 0.1 W and not more than 2 W, and a thickness of not less than 5 mm and not more than 10 mm, a distance between each inner edge of the pair of the heat-affected zones and the center of the weld bead in the width direction is not less than 1 W and not more than 4 W on the first surface, a distance between each outer edge of the pair of the heat-affected zones and the center of the weld bead in the width direction is not less than 0.6 W and not more than 14 W, and a tensile residual stress $\sigma_R$ in a direction perpendicular to the weld bead on a surface of the target metal is not more than YSb/2 at a position located 1 mm outward from a weld toe of the weld bead on a surface of the target metal having the first high-energy density beam irradiated thereto, where YSb represents a yield strength of the target material.

6. A method for manufacturing a butt-welded joint of a welded structure, the method including:

irradiating a first high-energy density beam to a butt portion between a pair of target metals, which are high-strength steel plates having a plate thickness exceeding 30 mm, on a first surface of the pair of the target metals to form only a single weld bead along a boundary line of the butt portion, wherein the weld bead has a width of W on the first surface and a width of W2 on a second surface of the pair of target metals that is opposite to the first surface, and wherein W2 is not larger than W, in a first irradiation step; and irradiating a second high-energy density beam to a right side and a left side of a center of the weld bead formed by the first high-energy density beam in a weld bead width direction, to heat an irradiated portion to a temperature not less than Ac1 and less than a melting temperature to form a pair of heat-affected zones having a band shape extending in the weld bead length direction in a second irradiation step, the pair of the heat-affected zones being located on the right side and the left side relative to the center of the weld bead in the width direction, whereby a tensile residual stress in the vicinity of a weld toe of the weld bead caused by the irradiation of the first high-energy density beam is alleviated, or modified into the compressive residual stress, wherein an amount of heat inputted in the second irradiation step is not less than 2% and not more than 30% of the amount of heat inputted in the first irradiation step, each of the pair of the heat-affected zones has a width of not less than 0.1 W and not more than 2 W, and a thickness of not less than 5 mm and not more than 10 mm, a distance between each inner edge of the pair of the heat-affected zones and the center of the weld bead in the width direction is not less than 1 W and not more than 4 W on the first surface, and a distance between each outer edge of the pair of the heat-affected zones and the center of the weld bead in the width direction is not less than 0.6 W and not more than 14 W.

* * * * *